(12) United States Patent
Rhee et al.

(10) Patent No.: US 7,852,952 B2
(45) Date of Patent: Dec. 14, 2010

(54) DSL SYSTEM LOADING AND ORDERING

(75) Inventors: Wonjong Rhee, Palo Alto, CA (US);
Iker Almandoz, Palo Alto, CA (US);
John M. Cioffi, Atherton, CA (US); Bin Lee, Palo Alto, CA (US); Georgios Ginis, San Francisco, CA (US)

(73) Assignee: Adaptive Spectrum and Signal Alignment, Inc., Redwood, CA (US)

( * ) Notice: Subject to any disclaimer, the term of this patent is extended or adjusted under 35 U.S.C. 154(b) by 1224 days.

(21) Appl. No.: 11/344,873

(22) Filed: Feb. 1, 2006

(65) Prior Publication Data
US 2006/0280237 A1    Dec. 14, 2006

Related U.S. Application Data

(60) Provisional application No. 60/689,348, filed on Jun. 10, 2005, provisional application No. 60/698,113, filed on Jul. 10, 2005.

(51) Int. Cl.
*H04K 1/10* (2006.01)
*H04L 27/28* (2006.01)

(52) U.S. Cl. .................. 375/260; 375/220; 375/221; 375/222

(58) Field of Classification Search ............... 375/260, 375/222, 259, 316; 370/335, 334
See application file for complete search history.

(56) References Cited

U.S. PATENT DOCUMENTS 5,181,198 A    1/1993  Lechleider
5,479,447 A    12/1995 Chow et al.
5,511,119 A    4/1996  Lechleider
5,621,768 A    4/1997  Lechleider (Continued)

FOREIGN PATENT DOCUMENTS

CN    101461253    6/2009

(Continued)

OTHER PUBLICATIONS

"International Search Report and Written Opinion", PCT Application No. PCT/US2007/013393, (Jan. 4, 2008).

(Continued)

*Primary Examiner*—Chieh M Fan
*Assistant Examiner*—Qutbuddin Ghulamali
(74) *Attorney, Agent, or Firm*—Blakely, Sokoloff, Taylor & Zafman

(57) ABSTRACT

Loading and ordering techniques are provided for one-sided and two-sided vectored line groups, as well as loading methodologies that also can be used on a single line, in communication systems such as Digital Subscriber Line (DSL) binders. In particular, a method for loading bits into a plurality of lines in a vectored DSL system using Discrete MultiTone (DMT) modulation is disclosed. The method iteratively determines two or more of the following sequentially: line ordering for each tone; power spectral density for the transmitted signal of each line; and bit allocation for the signal of each line. In some embodiments, line ordering may include order-swapping which may assign a first line to a first initial position, assign a second line to a second initial position, move the first line to the second initial position, and move the second line to the first initial position.

20 Claims, 13 Drawing Sheets

U.S. PATENT DOCUMENTS

| | | | |
|---|---|---|---|
| 5,901,205 | A | 5/1999 | Smith et al. |
| 6,075,821 | A | 6/2000 | Kao et al. |
| 6,134,274 | A | 10/2000 | Sankaranarayanan |
| 6,147,963 | A | 11/2000 | Walker et al. |
| 6,393,052 | B2* | 5/2002 | Sadjadpour et al. ......... 375/222 |
| 6,507,608 | B1 | 1/2003 | Norrell |
| 6,597,745 | B1 | 7/2003 | Dowling |
| 6,636,603 | B1 | 10/2003 | Milbrandt |
| 6,744,811 | B1 | 6/2004 | Kantschuk |
| 6,870,888 | B1* | 3/2005 | Shapiro et al. ............. 375/260 |
| 6,940,973 | B1 | 9/2005 | Yeap et al. |
| 7,356,049 | B1* | 4/2008 | Rezvani ....................... 370/484 |
| 2001/0055332 | A1* | 12/2001 | Sadjadpour et al. ......... 375/222 |
| 2002/0044610 | A1 | 4/2002 | Jones |
| 2003/0072380 | A1 | 4/2003 | Huang |
| 2003/0086362 | A1 | 5/2003 | Hasegawa et al. |
| 2003/0086514 | A1 | 5/2003 | Ginis et al. |
| 2003/0235245 | A1 | 12/2003 | Erdogan et al. |
| 2004/0001552 | A1* | 1/2004 | Koifman ...................... 375/260 |
| 2004/0021595 | A1* | 2/2004 | Erdogan et al. ............. 341/144 |
| 2004/0086064 | A1 | 5/2004 | Van Acker et al. |
| 2004/0109546 | A1 | 6/2004 | Fishman |
| 2004/0120482 | A1* | 6/2004 | Bentley et al. ........... 379/93.01 |
| 2005/0052988 | A1 | 3/2005 | Tsatsanis et al. |
| 2005/0053229 | A1 | 3/2005 | Tsatsanis et al. |
| 2005/0123028 | A1 | 6/2005 | Cioffi et al. |
| 2005/0129218 | A1* | 6/2005 | Kimble et al. ............... 379/325 |
| 2005/0135567 | A1* | 6/2005 | Faulkner ................... 379/22.07 |
| 2005/0152385 | A1 | 7/2005 | Cioffi et al. |
| 2005/0175078 | A1 | 8/2005 | Redfern |
| 2005/0195892 | A1 | 9/2005 | Ginis et al. |
| 2005/0213718 | A1* | 9/2005 | Reina ....................... 379/93.26 |
| 2005/0220179 | A1 | 10/2005 | Tsatsanis |
| 2005/0281229 | A1 | 12/2005 | Girola et al. |
| 2006/0002457 | A1* | 1/2006 | Romano et al. ............. 375/222 |
| 2006/0062288 | A1* | 3/2006 | Hester ......................... 375/222 |
| 2006/0109779 | A1 | 5/2006 | Shah et al. |
| 2006/0133519 | A1 | 6/2006 | Tsatsanis et al. |
| 2006/0146945 | A1 | 7/2006 | Chow et al. |
| 2006/0291576 | A1* | 12/2006 | Dasgupta et al. ............ 375/260 |
| 2007/0081582 | A1* | 4/2007 | Ginis et al. ................. 375/222 |
| 2007/0171940 | A1* | 7/2007 | Chen .......................... 370/484 |
| 2009/0207985 | A1 | 8/2009 | Cioffi et al. |

FOREIGN PATENT DOCUMENTS

| | | |
|---|---|---|
| DE | 4444312 | 2/1996 |
| EP | 1 207 665 A | 5/2002 |
| GB | 2315392 | 1/1998 |
| WO | WO-95/31867 | 11/1995 |
| WO | WO-01/35611 | 5/2001 |
| WO | WO-2004/027579 | 4/2004 |
| WO | WO-2005094052 | 10/2005 |

OTHER PUBLICATIONS

Patent Cooperation Treaty, International Preliminary Report on Patentability and Written Opinion, PCT Application No. PCT/US2007/013393, (Dec. 24, 2008) 8 pages.

"International Search Report and Written Opinion", International Application No. PCT/IB2006/000499, 4 pgs, mailed Jun. 9, 2006.

"International Search Report and Written Opinion", International Application No. PCT/IB2006/000759, 6 pgs, mailed Aug. 16, 2006.

"International Search Report and Written Opinion", International Application No. PCT/IB2006/000884, 5 pgs, mailed Sep. 4, 2006.

Cendrillon, et al., "Improved Linear Crosstalk Precompensation for DSL", *IEEE International Conference on Acoustics, Speech and Signal Processing (ICASSP)*, (Sep. 2004), 4 pgs.

Cendrillon, et al., "Partial Crosstalk Cancellation Exploiting Line and Tone Selection in VDSL", (Sep. 2003).

Cendrillon, et al., "Partial Crosstalk Cancellation for Upstream VDSL", *EURASIP Journal on Applied Signal Processing*, (Oct. 2004), 16 pgs.

Cendrillon, et al., "Partial Crosstalk Precompensation for Downstream VDSL", *Published by Elsevier North-Holland, Inc.*; vol. 84 issue 11; ISSN:0165-1684, (Nov. 2004), 15 pgs.

Cendrillon, et al., "The Linear Zero-Forcing Crosstalk Canceller is Near-optimal in DSL Channels", *IEEE Global Communications Conference (Globalcom)*; Dallas; Texas., (Dec. 2004), 5 pgs.

Cheong, Minho, et al., "Computationally Efficient Cancellation of Partially-overlapped Crosstalk in Digital Subscriber Lines", Globalcom 2005; St. Louis, Missouri; Nov. 28-Dec. 2, (2005), 5 pgs.

Cioffi, John, et al., "Canonical packet transmission on the ISI channel with Gaussian noise", *Global Telecommunications conference 1996, IEEE*, New York, NY, vol. 2 (Nov. 18, 2005), pp. 1405-1410.

Cioffi, John M., et al., "Canonical Packet Transmission on the ISI Channel with Guassian Noise", *Global Telecommunications Conference*; London, UK., XP-010220148, (Nov. 18, 1996), 1405-1410.

Cioffi, John M., "Dynamic Spectrum Management Report", Broadband World Forum; London, England, (Sep. 10. 2003).

Cioffi, John M., "Dynamic Spectrum Management Report", *Committee T1—Telecommunications Working Group NAI*, San Francisco, California, 75 pgs. (Feb. 21, 2005).

Cioffi, John, et al., "MIMO Channel Measurement Test Plan", (Feb. 17, 2003).

Cioffi, John M., "Spectrum Management with Advancing DSLs" Nov. 27-Dec. 1, 2000.

Cioffi, John, "The Fast Adaptive Rotor's RLS Algorithm", *IEEE Transactions on Acoustics, Speech and Signal Processing*, New York, NY, US vol. 38, No. 4, (Apr. 1, 1990), pp. 631-653.

Cioffi, John, et al., "Vectored VDSL (99-559)" (Dec. 5, 1999).

Cuypers, et al., "Combined per tone equalization and receiver windowing in DSL receivers: WiPTEQ", *Elsevier Science Publishers*, Amsterdam, NL, vol. 85, No. 10, (Oct. 2005), pp. 1921-1942.

Cuypers, et al., "Combining Per Tone equalization and windowing in DMT receivers", *IEEE International Conference on Acoustics, Speech and Signal Processing (ICASSP)*; Orlando, Florida. (Sep. 2002).

Fang, Jeannie L., "Modeling and Characterization of Copper Access Systems", (May 31, 2002).

Fischer, "Appendix E of "Precoding and Signal Shaping for Digital Transmission"", *Wiley-IEEE Press*, ISBN: 978-0-471-22410-5, (Aug. 2002), 10 pgs.

Forouzan, et al., "Generalized Iterative Spectrum Balancing and Grouped Vectoring for Maximal Throughput of Digital Subscriber Lines", *Globalcom 2005*; St. Louis, Missouri., (Dec. 2, 2005), 5 pgs.

Ginis, George, et al., "A Multiuser precoding scheme achieving crosstalk cancellation with application to DSL systems", *Signals, Systems, and Computers, 200. IEEE* vol. 2., (Oct. 29, 2000), pp. 1627-1631.

Ginis, George, et al., "Alien Crosstalk Cancellation for Multipair Digital Subscriber Line Systems", vol. 2006 Article ID 16828 (2006).

Ginis, George, et al., "Blind adaptive MIMO decision feedback equalization using givens rotations", *IEEE International Conference on Communications*, New York, NY, US, vol. 1 of 5., (Apr. 28, 2002), pp. 59-63.

Harashima, et al., "Matched-transmission technique for channels with intersymbol interference", *IEEE Transactions on Communication*; vol. COM-20, No. 4, (Aug. 1972), 774-780.

Ilani, Ishai, "Crosstalk Cancellation for Multi-Line G.shdsl Systems," (Aug. 19, 2002).

Im, Gi-Hong, et al., "FEXT Cancellation for Multi-Carrier Transmission System", (Apr. 11, 2002).

Laroia, et al., "A Simple and Effective Precoding Scheme for Noise Whitening in Intersymbol Inference Channels", *IEEE Trans. on Communication*; vol. 41, (Oct. 1993), 1460-1463.

Lee, et al., "Binder MIMO Channels", *submitted to IEEE Journal on Selected Areas in Communications*, Reference No. XP-001143167, (Jun. 2002), 20 pgs.

Louveaux, et al., "Downstream VDSL Channel Tracking Using Limited Feedback for Crosstalk Precompensated Schemes", *IEE ICASSP*; Philadelphia, Pennsylvania, (Mar. 2005), 4 pgs.

Magesacher, et al., "Exploiting the Common-Mode Signal in xDSL", *Proc. 12th European Signal Processing Conference (EUSIPCO 2004)*, Vienna, Austria, Sep. 7-10, 2004., 4 pgs.

Otte, M, et al., "Complex CORDIC-like algorithms for linearly constrained MVDR beamforming", *Broadband Communications*, 2000. Piscataway, NJ, US., (Feb. 15, 2000), pp. 97-104.

Patent Cooperation Treaty, "International Search Report and Written Opinion", International Application No. PCT/IB2006/000482, mailed May 18, 2006.

Patent Cooperation Treaty, "International Search Report and Written Opinion", International Application No. PCT/IB2006/000744, mailed Aug. 31, 2006.

Paul, Clayton R., "Analysis of Multiconductor Transmission Lines", *John Wiley & Sons*, Chapters 2 and 3, (1994), 46-186.

Song, et al., "Dynamic Spectrum Management for Next-Generation DSL Systems", *IEEE Communications Magazine*, XP-002395021, (Oct. 2002), 101-109.

Starr, et al., "DSL Advances", *Chapters 3, 7, and 11; Prentice-Hall*, (2003).

Tomlinson, "New Automatic Equaliser Employing Modulo Arithmetic", *Electr. Letters*; vol. 7., (Mar. 1971), 138-139.

Voyan Technology, "Vectoring Techniques for Multi-Line 10MDSL Systems", (Aug. 2002).

Wei, "Generalized Square and Hexagonal Constellations for Intersymbol-Interference Channels with Generalized Tomlinson-Harashima Precoders", *IEEE Transactions on Communications*, vol. 42, No. 9, (Sep. 1994), 9 pgs.

Examination Report mailed Apr. 8, 2009 for European Application No. 06744467.9 (Apr. 8, 2009), 6 pages.

Examination Report mailed Apr. 1, 2009 for European Application No. 07795837.9, (Apr. 1, 2009), 4 pages.

Chapter 13, Notes for Course EE479 taught at Stanford University during Fall 2005 (44 pgs).

Chapter 14, Notes for Course EE479 taught at Stanford University during Fall 2005 (36 pgs).

Invitation to Pay Additional Fees, International Application No. PCT/IB2006/000744 (6 pages).

Yu et al., "Distributed Multiuser Power Control for Digital Subscriber Lines," IEEE Journal on Selected Areas in Communications; IEEE Service Center, Piscataway, US; vol. 20, No. 5, Jun. 2002; ISSN: 0733-8716. Reference No. XP-011065508. (11 pages).

Song et al., "Dynamic Spectrum Management for Next-Generation DSL Systems," IEEE Communications Magazine; IEEE Service Center, New York, NY, US; vol. 40, No. 10, Oct. 2002; pp. 101-109; ISSN: 0163-6804. Reference No. XP-001132769. (9 pages).

Campello, "Practical Bit Loading for DMT," ICC '99, 1999 IEEE International Conference on Communications; Conference Record; Vancouver, Canada; Jun. 6-10, 1999; IEEE International Conference on Communications; New York, NY: IEEE, US, vol. 2; Jun. 6, 1999; pp. 801-805; ISBN: 0-7803-5285-8. Reference No. XP-000897971. (5 pages).

Panigrahi, Saswat et al., "Fine-Granularity Loading Schemes using Adaptive Reed-Solomon Coding for Discrete Multitone Modulation Systems", (2005).

Papandreou, Nikolaos "Cooperative Bit-Loading and Fairness Bandwidth Allocation in ADSL Systems", (2003).

Non-Final Office Action for China Application No. 200780021083.0 Mailed Apr. 1, 2010, 6 Pages.

Non-Final Office Action for China Application No. 200680027325.2 Mailed Aug. 4, 2010, 8 Pages.

\* cited by examiner

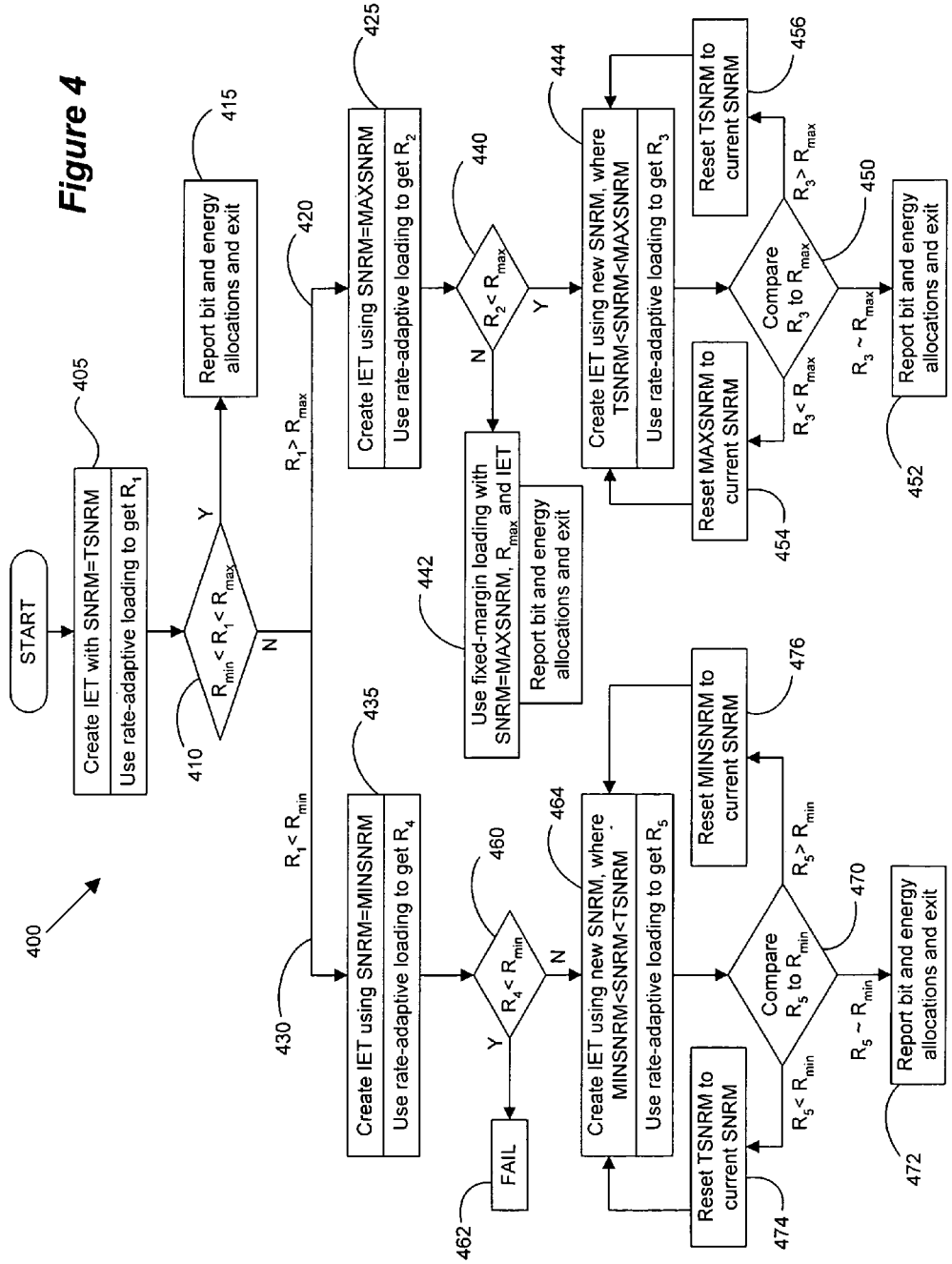

DSL SYSTEM LOADING AND ORDERING

CROSS-REFERENCE TO RELATED APPLICATIONS

This application claims the benefit of priority under 35 U.S.C. §119(e) of the following:

U.S. Provisional No. 60/689,348 filed on Jun. 10, 2005, entitled DSL SYSTEM LOADING AND ORDERING, the entire disclosure of which is incorporated herein by reference in its entirety for all purposes.

U.S. Provisional No. 60/698,113 filed on Jul. 10, 2005, entitled DSL SYSTEM, the entire disclosure of which is incorporated herein by reference in its entirety for all purposes.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable.

BACKGROUND

1. Technical Field

This invention relates generally to methods, systems and apparatus for managing digital communications systems.

2. Description of Related Art

Digital subscriber line (DSL) technologies provide potentially large bandwidth for digital communication over existing telephone subscriber lines (referred to as loops and/or the copper plant). In particular, DSL systems can adjust to the characteristics of the subscriber line by using a discrete multitone (DMT) line code that assigns a number of bits to each tone (or sub-carrier), which can be adjusted to channel conditions as determined during training and initialization of the modems (typically transceivers that function as both transmitters and receivers) at each end of the subscriber line.

In DSL systems using DMT modulation, both the transmitting and the receiving side must negotiate configuration parameters for data transmission during a phase called initialization or training before actual transmission of information. Important sets of parameters that need to be determined in all such systems before normal operation include power spectral density and bit allocation. Moreover, the ordering of the lines must also be determined for multi-line vectored systems. Deployment practice requires that DSL systems operate within certain constraints, such as data rate, margin, transmitted power, transmitted power spectral density and various related parameters. Existing methods for power spectral density determination and bit allocation are deficient in producing efficient solutions that meet all the above constraints. Efficient solutions for bit allocation, power spectral density determination and line ordering have previously not been proposed.

Systems, methods and techniques that permit efficient loading and/or ordering for single communication lines and vectored communication systems would represent a significant advancement in the art. Also, systems, methods and techniques that that can be easily integrated with, controlled by and/or assisted by a controller or the like likewise would represent a significant advancement in the art.

BRIEF SUMMARY

Embodiments of the present invention provide new loading methods for single-user and multi-user communication systems. For multi-user vectoring systems, ordering methods as well as loading methods are furnished for a supplied rate-tuple within a rate region. The methods determine acceptable user loadings and orderings so that the rate-tuple can be implemented.

Loading and ordering techniques are provided for one-sided vectored lines (though, as will be appreciated by those skilled in the art, many of the same techniques, apparatus, methods, computer program products, etc. can be applied to two-sided vectored lines also), as well as loading techniques that also can be used on a single line in communication systems such as DSL binders. For single-users, embodiments of the invention optimally allocate bits and energy for a given set of parameters, which may include maximum rate, minimum rate, maximum margin, target margin, minimum margin and PSD mask of any shape. Iterations, bit-swapping during loading, and/or adaptive margin updates during loading can be used in the single-user loading of this invention. The techniques have low complexity and can be used for a variety of loading objectives and/or goals, such as rate-adaptive, margin-adaptive and fixed-margin objectives.

For one-sided vectored DSL, some loading and ordering embodiments determine acceptable allocations of bits, energy, and decoding (for example, GDFE)/precoding ordering(s) for each tone of each user for a specified set of rates on the vectored lines. PSD determination, ordering and bit allocation can be iteratively used in the multi-user loading and ordering of some embodiments of the present invention. Such methods can augment and alter the criteria used for bit swapping procedures used in single lines (or in bonded multiple lines for a single user) so that a favorable vector of rates is achieved for all users and/or lines. A constant-margin, greedy loading method or sub-method can be altered to include and/or accommodate the ordering of decoding/precoding on each tone of a vectored DMT system in a convergent process. Order swapping may be introduced to adjust a bit vector and/or rate vector within a constant-rate-sum convex subset of a hyperplane towards the desired vector of user rates for each of the lines. The technique can converge early if the rate-tuple is not too aggressively chosen near the boundary of the rate region for all the vectored lines. At each step the distance between the current rate-tuple and the desired rate-tuple is reduced. The procedure may depend on a user-partitioning process that categorizes 3 types of users—under rate, above rate and at rate—that follows each instance of a modified power-minimizing loading technique.

Further details and advantages of the invention are provided in the following Detailed Description and the associated Figures.

BRIEF DESCRIPTION OF THE DRAWINGS

The present invention will be readily understood by the following detailed description in conjunction with the accompanying drawings, wherein like reference numerals designate like structural elements, and in which:

FIG. 4 is a flow diagram illustrating one or more single-line loading methods according to embodiments of the present invention helping to illustrate Example 2.

DETAILED DESCRIPTION

Figure 1:
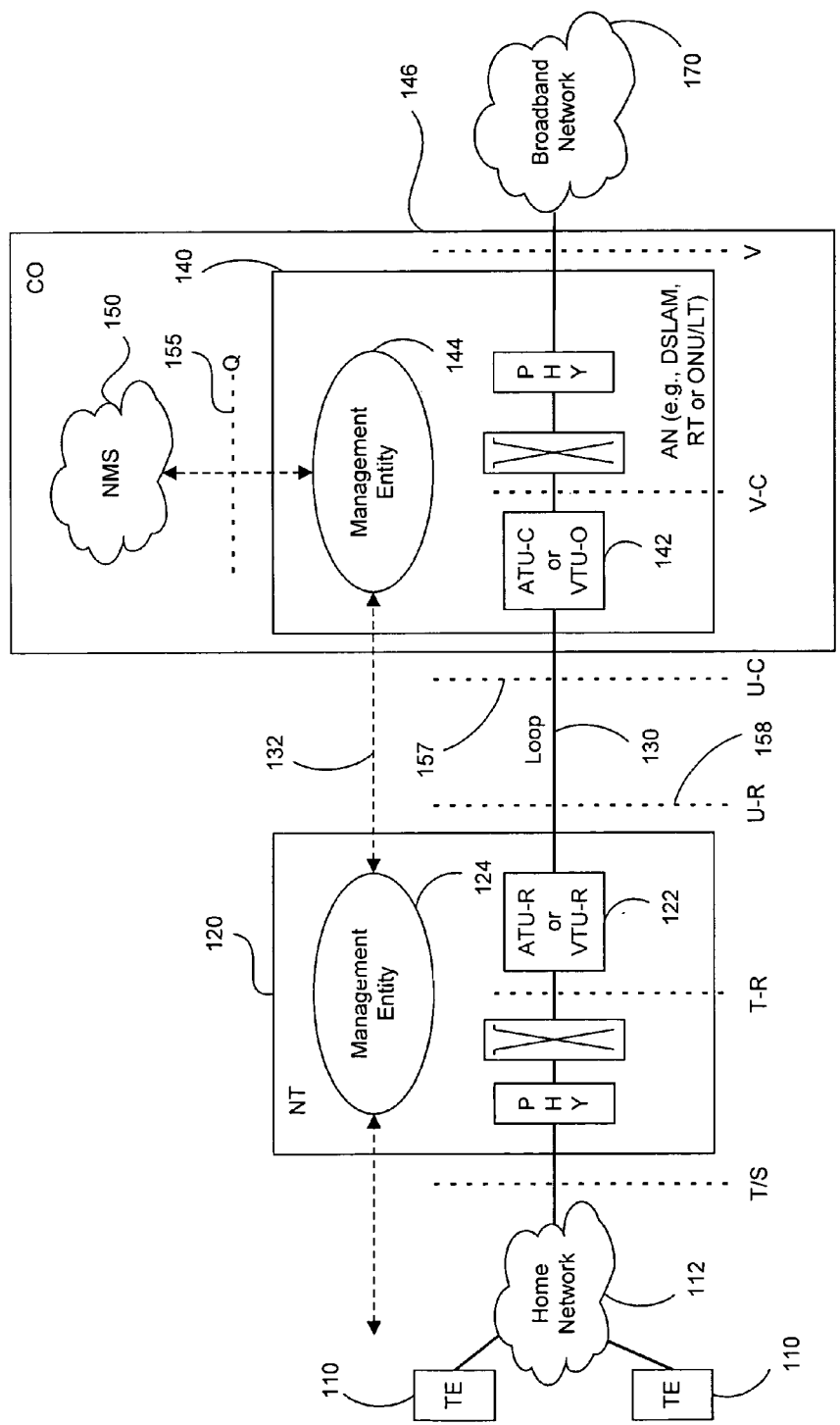
FIG. 1 is a schematic block reference model system per the G.997.1 standard applicable to ADSL, VDSL and other communication systems in which embodiments of the present invention may be used.

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited embodiments.

Embodiments of the present invention implement methods and apparatus that permit efficient loading and/or ordering for single communication lines and vectored communication systems. The communication system in which embodiments of the present invention may be used may include ADSL lines, VDSL lines, one or more other xDSL systems and/or lines, and/or or any other communication system components and/or lines with which the present invention is practical, as will be appreciated by those skilled in the art after reading the present disclosure.

As described in more detail below, implementation of loading and ordering methods and techniques according one or more embodiments of the present invention can be part of or be implemented in or by a communication device (for example, a controller, DSL optimizer, DSLAM, LT device, RT device, DSL modem and the like). Such implementation may be controlled and/or assisted by a load/order control unit in a local device (again, for example, a modem) and/or in a remote device, such as a controller (for example, in or as a DSL optimizer, dynamic spectrum manager or spectrum management center). The load/order control unit can be located anywhere. In some embodiments, a controller having a load/order control unit resides in a DSL CO, while in other cases it may be operated by a third party located outside the CO. The structure, programming and other specific features of a controller and/or load/order control unit usable in connection with embodiments of the present invention will be apparent to those skilled in the art after reviewing the present disclosure.

A controller, such as a DSL optimizer, dynamic spectrum management center (DSM Center), a "smart" modem and/or computer system can be used to collect and analyze the operational data and/or performance parameter values as described in connection with the various embodiments of the present invention. The controller and/or other components can be a computer-implemented device or combination of devices. In some embodiments, the controller is in a location remote from modems or other communication equipment coupled to a communication line. In other cases, the controller may be collocated with one of or both of the "local" devices (that is, devices directly coupled to a communication line or part of such a local device) as equipment directly connected to a modem, DSLAM or other communication system device, thus creating a "smart" modem. The phrases "coupled to" and "connected to" and the like are used herein to describe a connection between two elements and/or components and are intended to mean coupled either directly together, or indirectly, for example via one or more intervening elements or via a wireless connection, where appropriate.

Some of the following examples of embodiments of the present invention will be used in connection with one-sided or two-sided vectored ADSL and/or VDSL systems as exemplary communications systems. For multi-line vectored DSL systems using DMT modulation, the problem of bit allocation and power spectral density determination becomes more complicated because these parameters need to optimized for multiple lines. Additionally, the ordering of the lines needs to be determined either for decoding (typically for upstream transmission), or for precoding (typically for downstream transmission).

Within these DSL systems, certain conventions, rules, protocols, etc. may be used to describe operation of the exemplary DSL system and the information and/or data available from customers (also referred to as "users") and/or equipment on the system. However, as will be appreciated by those skilled in the art, embodiments of the present invention may be applied to various communications systems, and the invention is not limited to any particular system.

Various network-management elements are used for management of ADSL and VDSL physical-layer resources, where elements refer to parameters or functions within an ADSL or VDSL modem pair, either collectively or at an individual end. A network-management framework consists of one or more managed nodes, each containing an agent. The managed node could be a router, bridge, switch, modem or other. At least one NMS (Network Management System), which is often called the manager, monitors and controls managed nodes and is usually based on a common PC or other computer. NMS also may be referred to in some instances as an Element Management System (EMS). NMS and EMS systems are considered to be parts of Operations Support Systems (OSS). A network management protocol is used by the manager and agents to exchange management information and data. The unit of management information is an object. A collection of related objects is defined as a Management Information Base (MIB).

FIG. 1 shows the reference model system according to the G.997.1 standard (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+ (G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

The G.997.1 standard specifies the physical layer management for ADSL and VDSL transmission systems based on the clear embedded operation channel (EOC) defined in G.997.1 and use of indicator bits and EOC messages defined in G.99x standards. Moreover, G.997.1 specifies network management elements content for configuration, fault and performance management. In performing these functions, the system utilizes a variety of operational data that are available at and can be collected from an access node (AN). The DSL Forum's TR69 report also lists the MIB and how it might be accessed. In FIG. 1, customers' terminal equipment 110 is coupled to a home network 112, which in turn is coupled to a network termination unit (NT) 120. In the case of an ADSL system, NT 120 includes an ATU-R 122 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 120 also includes a management entity (ME) 124. ME 124 can be any suitable hardware device, such as a microprocessor, microcontroller, or circuit state machine in firmware or hardware, capable of performing as required by any applicable standards and/or other criteria. ME 124 collects and stores performance data in its MIB, which is a database of information maintained by each ME, and which can be accessed via network management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 1, ATU-C 142 is located at an access node (AN) 140 in a CO 146. AN 140 may be a DSL system component, such as a DSLAM, ONU/LT, RT or the like, as will be appreciated by those skilled in the art. An ME 144 likewise maintains an MIB of performance data pertaining to ATU-C 142. The AN 140 may be coupled to a broadband network 170 or other network, as will be appreciated by those skilled in the art. ATU-R 122 and ATU-C 142 are coupled together by a loop 130, which in the case of ADSL (and VDSL) typically is a telephone twisted pair that also carries other communication services.

Several of the interfaces shown in FIG. 1 can be used for determining and collecting operational and/or performance data. To the extent the interfaces in FIG. 1 differ from another ADSL and/or VDSL system interface scheme, the systems are well known and the differences are known and apparent to those skilled in the art. The Q-interface 155 provides the interface between the NMS 150 of the operator and ME 144 in AN 140. All the parameters specified in the G.997.1 standard apply at the Q-interface 155. The near-end parameters supported in ME 144 are derived from ATU-C 142, while the far-end parameters from ATU-R 122 can be derived by either of two interfaces over the U-interface. Indicator bits and EOC messages, which are sent using embedded channel 132 and are provided at the PMD layer, can be used to generate the required ATU-R 122 parameters in ME 144. Alternately, the OAM (Operations, Administrations and Management) channel and a suitable protocol can be used to retrieve the parameters from ATU-R 122 when requested by ME 144. Similarly, the far-end parameters from ATU-C 142 can be derived by either of two interfaces over the U-interface. Indicator bits and EOC messages, which are provided at the PMD layer, can be used to generate the required ATU-C 142 parameters in ME 124 of NT 120. Alternately, the OAM channel and a suitable protocol can be used to retrieve the parameters from ATU-C 142 when requested by ME 124.

At the U-interface (which is essentially loop 130), there are two management interfaces, one at ATU-C 142 (the U-C interface 157) and one at ATU-R 122 (the U-R interface 158). Interface 157 provides ATU-C near-end parameters for ATU-R 122 to retrieve over the U-interface 130. Similarly, interface 158 provides ATU-R near-end parameters for ATU-C 142 to retrieve over the U-interface 130. The parameters that apply may be dependent upon the transceiver standard being used (for example, G.992.1 or G.992.2).

The G.997.1 standard specifies an optional OAM communication channel across the U-interface. If this channel is implemented, ATU-C and ATU-R pairs may use it for transporting physical layer OAM messages. Thus, the transceivers 122, 142 of such a system share various operational and performance data maintained in their respective MIBs.

More information can be found regarding ADSL NMSs in DSL Forum Technical Report TR-005, entitled "ADSL Network Element Management" from the ADSL Forum, dated March 1998. Also, DSL ForumTechnical Report TR-069, entitled "CPE WAN Management Protocol," dated May 2004. Finally, DSL Forum Technical Report TR-064, entitled "LAN-Side DSL CPE Configuration Specification," dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NAI-2005-031.

It is less common for lines sharing the same binder to terminate on the same line card in ADSL, than it is in VDSL. However, the following discussion of xDSL systems may be extended to ADSL because common termination of same-binder lines might also be done (especially in a newer DSLAM that handles both ADSL and VDSL). In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder, where the loop is sometimes shielded from external electromagnetic interference, but is subject to crosstalk. After the pedestal, the drop wire is often unaffected by crosstalk when this pair is far from other pairs for most of the drop, but transmission can also be more significantly impaired by electromagnetic interference because the drop wires are unshielded. Many drops have 2 to 8 twisted-pairs within them and in situations of multiple services to a home or bonding (multiplexing and demultiplexing of a single service) of those lines, additional substantial crosstalk can occur between these lines in the drop segment.

Figure 2:
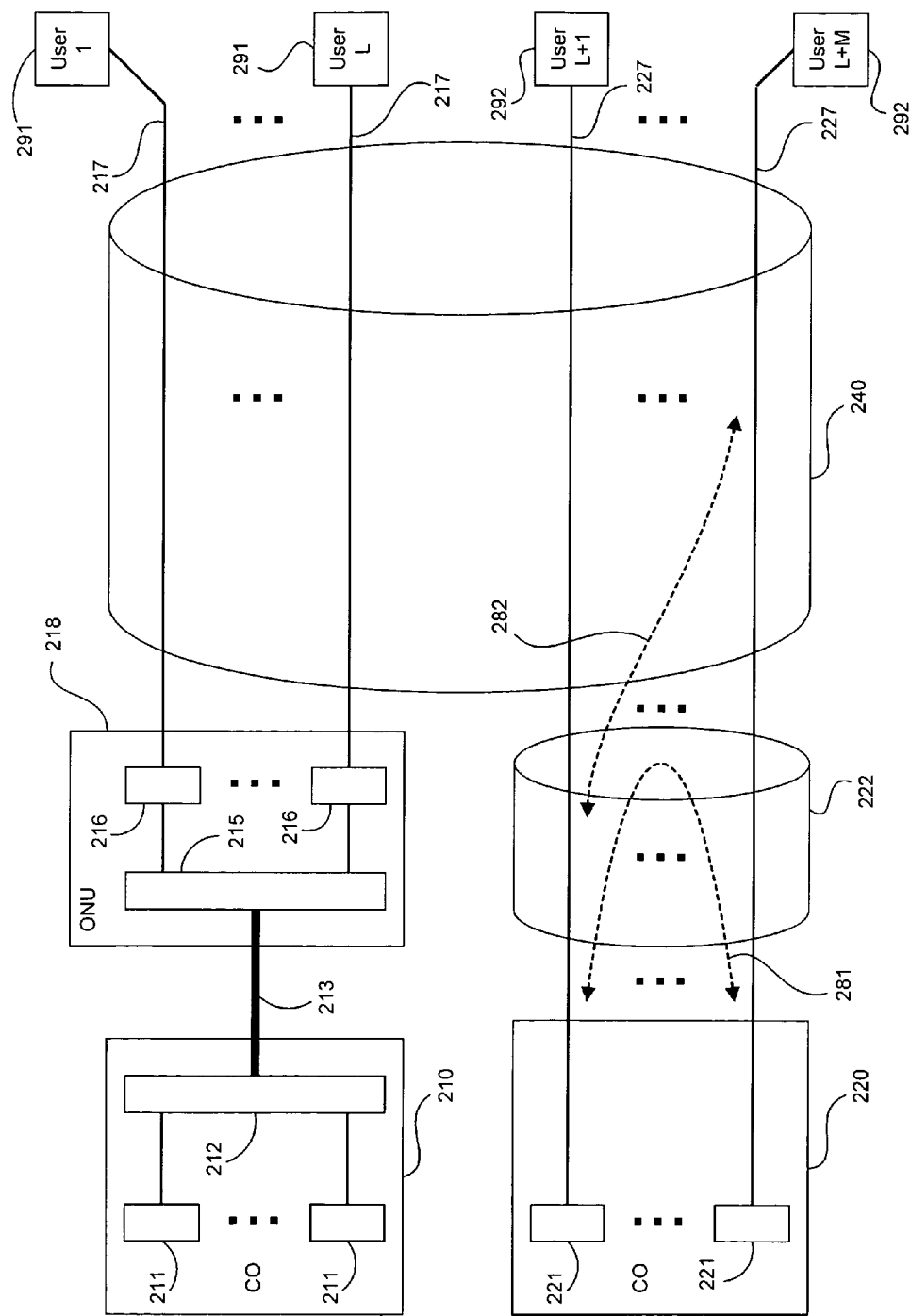
FIG. 2 is a schematic diagram illustrating generic, exemplary DSL deployment.

A generic, exemplary DSL deployment scenario is shown in FIG. 2. All the subscriber loops of a total of (L+M) users 291, 292 pass through at least one common binder. Each user is connected to a Central Office (CO) 210, 220 through a dedicated line. However, each subscriber loop may be passing through different environments and mediums. In FIG. 2, L customers or users 291 are connected to CO 210 using a combination of optical fiber 213 and twisted copper pairs 217, which is commonly referred to as Fiber to the Cabinet (FTT-Cab) or Fiber to the Curb. Signals from transceivers 211 in CO 210 have their signals converted by optical line terminal 212 and optical network terminal 215 in CO 210 and optical network unit (ONU) 218. Modems 216 in ONU 218 act as transceivers for signals between the ONU 218 and users 291.

Users' lines that co-terminate in locations such as COs 210, 218 and ONU 220 (as well as others) may be operated in a coordinated fashion, such as vectoring. In vectored communication systems (such as vectored ADSL and/or VDSL systems), coordination of signals and processing can be achieved. Downstream vectoring occurs when multiple lines' transmit signals from a DSLAM or LT are co-generated with a common clock and processor. In VDSL systems with such a common clock, the crosstalk between users occurs separately for each tone. Thus each of the downstream tones for many users can be independently generated by a common vector transmitter. Similarly, upstream vectoring occurs when a common clock and processor are used to co-receive multiple lines' signals. In VDSL systems with such a common clock, the crosstalk between users occurs separately for each tone. Thus each of the upstream tones for many users can be independently processed by a common vector receiver.

The loops 227 of the remaining M users 292 are copper twisted pairs only, a scenario referred to as Fiber to the Exchange (FTTEx). Whenever possible and economically feasible, FTTCab is preferable to FTTEx, since this reduces the length of the copper part of the subscriber loop, and consequently increases the achievable rates. Moreover, FTT-Cab is expected to become an increasingly popular topology. This type of topology can lead to substantial crosstalk interference and may mean that the lines of the various users have different data carrying and performance capabilities due to the specific environment in which they operate. The topology can be such that fiber-fed "cabinet" lines and exchange lines can be mixed in the same binder. The crosstalk noises created by lines terminating at different places usually cannot be canceled directly by well-known decision-feedback mechanisms and instead represent time-varying spatial noises that can be completely or partially canceled by the invention described herein.

As can be seen in FIG. 2, the lines from CO 220 to users 292 share binder 222, which is not used by the lines between CO 210 and users 291. Moreover, another binder 240 is common to all the lines to/from CO 210 and CO 220 and their respective users 291, 292. In FIG. 2, far end crosstalk (FEXT) 282 and near end crosstalk (NEXT) 281 are illustrated as affecting at least two of the lines 227 collocated at CO 220.

As will be appreciated by those skilled in the art, at least some of the operational data and/or parameters described in these documents can be used in connection with embodiments of the present invention. Moreover, at least some of the system descriptions are likewise applicable to embodiments of the present invention. Various types of operational data and/or information available from a DSL NMS can be found therein; others may be known to those skilled in the art.

Loading in DMT DSL systems (that is, the assigning of bits to tones) typically is controlled by methods, sub-methods and/or other similar processes and/or procedures to achieve desired goals. For example, good loading methodologies for groups of users ensure that the rates of individual users are as high as possible or otherwise feasible or desired, effectively generating the largest volume for the region of allowed rate tuples for the set of users. Good loading also can mean that the power used for data transmission is a minimum or as low as feasible for a given rate and margin combination, achieving efficient points within the enlarged rate region. For a single-line user, a good loading methodology maximizes the rate and/or margin while minimizing used energy. Poor loading methods can render very low data rates for some users while others get excessive rates or use excessive power or binder resources to achieve those rates, thus reducing the volume of the rate region. The order in which users' data is decoded and precoded in vectored DSL systems can significantly expand the volume of this rate region. Good rate regions can expand the performance of the system for users (including improving a DSL service provider's profitability) by allowing the maximum and/or most beneficial simultaneous trade-off of rates between users (for example, users sharing a binder).

A communication line such as a DSL line often is controlled using an operating-parameter profile that limits, designates and/or establishes ranges for various implementation and operating parameters. In DSL lines, MAXSNRM, TSNRM, MINSNRM, $R_{max}$, $R_{min}$, PSDMASK, MAX-NOMATP, MAXNOMPSD, MAXRXPWR, CARMASK, RFIBANDS and PSDREF (for upstream power back-off) typically are specified to establish how a single line or group of lines can operate (each of these parameters is well known to those skilled in the art and is found in one or more standards applicable to systems that can use embodiments of the present invention). Because ranges, rather than values, are specified for both margin and rate, the bit loading method used by a DSL modem to load bits into a DMT or other similar transmission scheme needs to find a solution (preferably the best solution available), subject to priorities such as those given below:

Satisfy power spectral density (for example, PSDMASK) and total power (for example, MAXNOMATP) constraints.

Achieve the maximum possible data rate in an available range (for example, between $R_{max}$ and $R_{min}$). If the rate is above $R_{min}$, then margin may need to be no less than a target margin (for example, TSNRM). If the rate is at $R_{min}$, the margin may need to be no less than a minimum margin (for example, MINSNRM).

Achieve the maximum possible margin within an available range (for example, between MINSNRM and MAXSNRM).

Use minimum energy.

Profile-limited loading is a common challenge in the DSL field. Embodiments of the present invention address the frequent problems that arise with loading and present methods, apparatus, etc. for finding optimal bit and energy allocations. Examples described below use a normalized incremental energy table (or "IET"), Table 1, in connection with Equation (1), both of which follow:

methods, sub-methods and/or techniques, such as margin-adaptive, rate-adaptive and fixed-margin loading techniques. When a modem is being trained, the channel/noise condition is not known, for example, see ratings 1 through 7 in Table 2 as follows:

TABLE 2

Margin (γ) and Rate (R) resulting from profile-limited loading

| Channel and noise condition | Achieved Margin (γ) | Achieved Rate (R) | Comments |
|---|---|---|---|
| Extremely good | γ = MAXSNRM | R = $R_{max}$ | FM can be used |
| Very good | TSNRM < γ < MAXSNRM | R = $R_{max}$ | MA (rate target = $R_{max}$) can be used |
| Good | γ = TSNRM | R = $R_{max}$ | MA (rate target = $R_{max}$) or RA (margin target = TSNRM) can be used |
| Moderate | γ = TSNRM | $R_{min}$ < R < $R_{max}$ | RA (margin target = TSNRM) can be used |
| Bad | γ = TSNRM | R = $R_{min}$ | RA (margin target = TSNRM) or MA (rate target = $R_{min}$) can be used |
| Very bad | MINSNRM < γ < TSNRM | R = $R_{min}$ | MA (rate target = $R_{min}$) can be used |
| Extremely bad | N/A | N/A | Modem can't enter showtime |

$$\epsilon = 2.8 \times 10^{0.98 + (SNRM - CODGAIN)/10} \quad \text{Equation (1)}$$

TABLE 1

Normalized (with respect to the ratio between noise power and channel gain) incremental energies for no trellis coding

| Number of loaded bits b | Normalized incremental energy Δ(b) | Normalized total energy $\Delta_{total} = \sum_{i=1}^{b} \Delta(i)$ |
|---|---|---|
| 1 | $\frac{1}{2}\varepsilon$ | $\frac{1}{2}\varepsilon$ |
| 2 | $\frac{1}{2}\varepsilon$ | ε |
| 3 | 2ε | 3ε |
| 4 | 2ε | 5ε |
| 5 | 5ε | 10ε |
| 6 | 11ε | 21ε |
| 7 | 20ε | 41ε |
| 8 | 44ε | 85ε |
| 9 | 80ε | 165ε |
| 10 | 176ε | 341ε |
| 11 | 320ε | 661ε |
| 12 | 704ε | 1,365ε |
| 13 | 1,280ε | 2,645ε |
| 14 | 2,816ε | 5,461ε |
| 15 | 5,120ε | 10,581ε |

COSGAIN is the coding gain, SNRM is the SNR margin, the uncoded SNR gap is assumed to be 9.8 dB, the required probability of bit error is $10^{-7}$ and ε represents a scaling factor for calculating energy. As can be seen from Equation (1), more energy is required as the SNRM is increased, and less energy is required as coding gain is increased. The energy also scales with the required probability of bit error. Only normalized incremental energy is shown in Table 1. The true incremental energy also is dependent on noise level and channel gain, and can be found by replacing ε in Equation (1) with $\epsilon \times 10^{(|H|^2 - |N|^2)/10}$, where $|H|^2$ is channel gain in dB, and $|N|^2$ is noise power in dB/Hz.

Embodiments of the preferred embodiment pertaining to single-line loading are not equivalent to any previous loading Nonetheless, previous loading methods constructed their incremental energy tables assuming TSNRM as the finally-achieved SNR margin and assigned bits starting from the tone with the minimum incremental energy for adding one bit (a minimum incremental energy table contains pre-calculated values on the incremental energy needed to load one additional bit to a tone as a function of the number of bits that are already loaded). The next tone with minimum incremental energy for an additional bit then is loaded, etc. These methods stop if $R_{max}$ is reached or MAXNOMATP (or any other total power parameter) is violated by adding an additional bit (as will be appreciated by those skilled in the art, conformance to PSDMASK or BITCAP can be achieved by setting incremental energy to infinity for any violation of PSDMASK or BITCAP). If $R_{max}$ was reached and MAXNOMATP was not violated, then all or part of the remaining power could be evenly allocated over all tones to increase their SNR margin from TSNRM to MAXSNRM or the highest SNRM possible. Such loading methods could produce an optimal or near-optimal bit and power allocation when PSDMASK was flat.

When PSDMASK is not flat, however, these previous loading methods often do not achieve optimal or even near-optimal results, one example of which is illustrated in Example 1.

Example 1

A simple DMT system uses two tones, where MAXSNRM=30 dB, TSNRM=6 dB, MINSNRM=0 dB, and $R_{max} = R_{min}$ are such that only 1 bit needs to be loaded per DMT symbol. PSDMASK, channel condition and noise condition are shown in Table 3:

TABLE 3

A simple DMT system with two tones

| | Tone 1 | Tone 2 |
|---|---|---|
| PSDMASK | −40 dBm/Hz | −80 dBm/Hz |
| Channel insertion loss | 0 dB | 0 dB |
| Noise power | −100 dBm/Hz | −101 dBm/Hz |

TABLE 3-continued

A simple DMT system with two tones

| | Tone 1 | Tone 2 |
|---|---|---|
| SNR with maximum power transmission | 60 dB | 21 dB |
| Incremental energy for 1 bit allocation for TSNRM = 6 | K × $10^{0.98+(6-3-100)/10}$, (coding gain of 3 dB is assumed, K is a constant) | K × $10^{0.98+(6-3-101)/10}$, (coding gain of 3 dB is assumed, K is a constant) |

Because noise is smaller for tone 2, the incremental energy for a one bit allocation is smaller for tone 2. Therefore, previous loading methods would allocate the single bit to tone 2. Assuming that 21 dB SNR corresponds to 7 dB of SNR margin for 1 bit loading, previous loading methods would have ended up with 7 dB SNR margin which is less than MAXSNRM=30 dB. As is apparent to those skilled in the art, however, an optimal bit loading method should allocate the single bit to tone 1, where SNR is 60 dB with maximum power transmission, so that MAXSNRM=30 dB can be achieved.

Embodiments of the present invention pertaining to single-line loading provide methods, apparatus, etc. to optimize loading for any shape of PSDMASK and any other parameter values. These embodiments utilize one or more of the following techniques (which can, as will be appreciated by those skilled in the art, be used in combination):
  Iterations;
  Bit swapping during loading; and/or
  Adaptive margin update during loading.

Figure 3A:
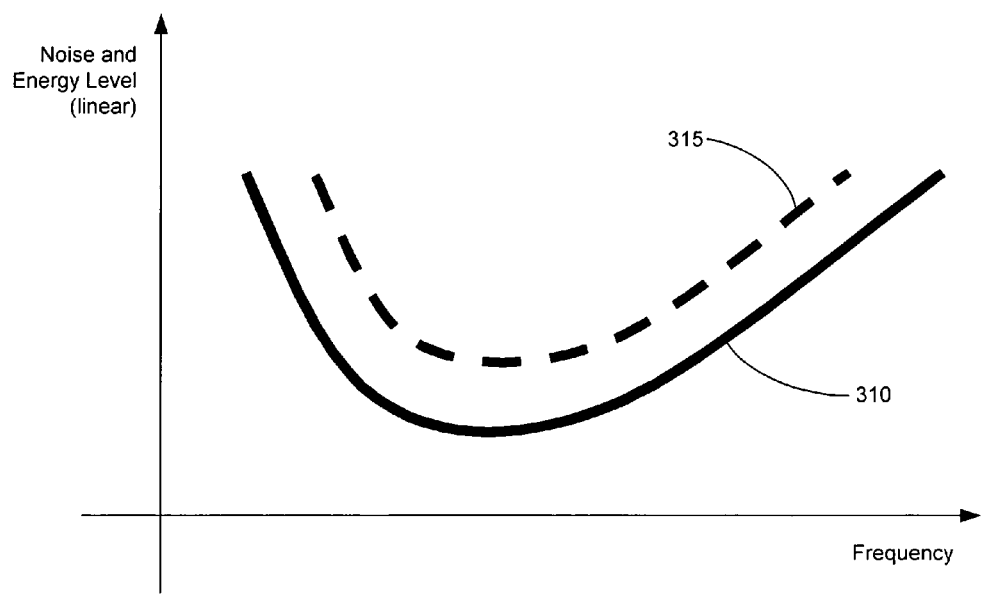
FIG. 3A is a plot illustrating one view of SNR margin considered during bit loading using one or more embodiments of the present invention.
Figure 3B:
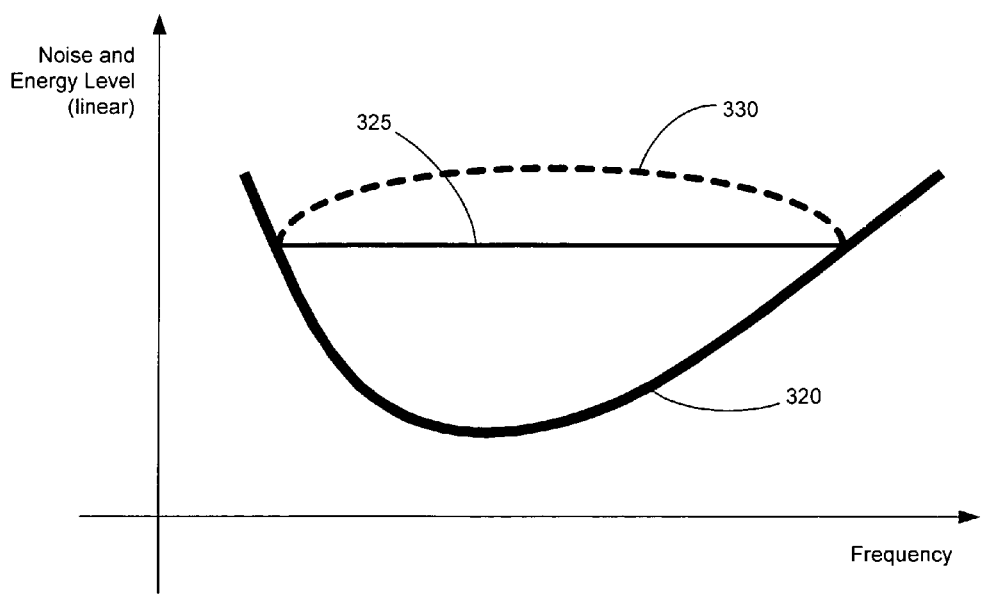
FIG. 3B is an alternative plot illustrating another view of SNR margin considered during bit loading using one or more embodiments of the present invention.

There are two alternative ways to consider SNR margin in the context of bit-loading methodologies. One approach, shown in FIG. 3A, is to perform bit loading assuming that the normalized noise with 0 dB of margin 310 (defined as the ratio of noise over channel gain) has been uniformly increased from 310 to 315 by the amount of required margin. Another approach, shown in FIG. 3B, is to perform bit loading assuming the original normalized noise 320 to achieve a desired water level 325, but to then allocate additional power to provide for SNR margin 330. Strictly speaking, the two procedures may give different results. However, for practical implementation, the results are identical. The examples that follow take the approach of FIG. 3B in accounting for SNR margin.

Example 2

As will be appreciated by those skilled in the art, energy and bit allocations need to be considered over all tones together so that performance is not dominantly impaired by one or a few tones only. Example 2 is an example of a profile-limited single DSL line loading using margin-adaptive iterations. FIG. 4 also illustrates one or more embodiments related to Example 2 (which will reference numerals in FIG. 4):

A. Loading with TSNRM at 405—Create an incremental energy table with SNRM=TSNRM. Use any suitable rate-adaptive loading technique with the incremental energy table. Define the resulting rate as $R_1$. If at 410 $R_1$ is between $R_{min}$ and $R_{max}$, then report the bit and energy allocations and exit at 415.
  (1) If $R_1$ is larger than $R_{max}$, go to step B via branch 420.
  (2) If $R_1$ is smaller than $R_{min}$, go to step C via branch 430.
B. $R_1 > R_{max}$—At 425 create an incremental energy table with SNRM=MAXSNRM and use any suitable rate-adaptive loading technique with the incremental energy table. Define the resulting rate as $R_2$.
  (1) If $R_2 \geq R_{max}$ at 440: use any suitable fixed-margin loading method with SNRM=MAXSNRM and $R_{max}$ and the incremental energy table. Report the bit and energy allocations and exit.
  (2) If $R_2 < R_{max}$ at 440: Do the following iterations:
    (a) At 444 choose an SNRM value between TSNRM and MAXSNRM (for example, a value near the average of TSNRM and MAXSNRM). For the chosen SNRM, create an incremental energy table and use the rate-adaptive loading method with the incremental energy table. Define the resulting rate as $R_3$.
    (b) If at 450 $R_3$ is acceptably close to $R_{max}$ (for example, within 10%), then report bit and energy allocations and exit at 452. If at 450 $R_3$ is unacceptably smaller than $R_{max}$, then set MAXSNRM=SNRM at 454 and go to B(2)(a). If at 450 $R_3$ is larger than $R_{max}$, then set TSNRM=SNRM at 456 and go to B(2)(a).
C. $R_1 < R_{min}$—At 435 create an incremental energy table with SNRM=MINSNRM and use the rate-adaptive loading method with the incremental energy table. Define the resulting rate as $R_4$.
  (1) If $R_4 < R_{min}$ at 460: Minimum rate requirement cannot be met. Report error and exit at 462.
  (2) If $R_4 \geq R_{min}$ at 460: Do the following iterations:
    (a) At 464 choose an SNRM value that is between TSNRM and MINSNRM (for example, a value near the average of TSNRM and MINSNRM). For the chosen SNRM, create an incremental energy table and use the rate-adaptive loading method with the incremental energy table. Define the resulting rate as $R_5$.
    (b) If at 470 $R_5$ is acceptably to $R_{min}$, then report the bit and energy allocations and exit at 472. If at 470 $R_5$ is unacceptably smaller than $R_{min}$, then set TSNRM=SNRM at 474 and go to C(2)(a). If at 470 $R_5$ is larger than $R_{min}$, then set MINSNRM=SNRM at 476 and go to C(2)(a).

The method of Example 2, above, frequently updates the incremental energy table with various values of SNRM, and such updates can be implemented efficiently by using a pre-calculated incremental-energy table in which SNRM=MINSNRM. When SNRM is equal to MINSNRM, the least amount of transmit energy is used, and thus only a minimum number of table entries will have infinite values as a result of BCAP and PSDMASK. For a given SNRM that is different from MINSNRM, the entries can be efficiently adjusted as follows. As can be seen from Equation (1), the transmit energy is proportional to the chosen SNRM. Therefore, all the entries in the updated table will be equal to the entries of the original table (that is, with SNRM=MINSNRM) scaled by the difference (SNRM−MINSNRM) in dB. There are two other parameters in loading that are directly related to energy—PSDMASK and MAXNOMATP. Therefore, instead of creating a new energy table, the PSDMASK can be normalized by the difference (SNRM−MINSNRM) to compute the table entries that should have infinite values. Also, the MAXNOMATP can be normalized by the difference (SNRM-MINSNRM) to take into account that the original table was computed for MINSNRM. Proceeding in this manner, only one incremental energy table needs to be constructed, greatly simplifying any frequent updates.

The method of Example 2 uses one or more (sub-method) iterations of well-known loading schemes such as rate-adaptive, margin-adaptive and/or fixed-margin methods to find the optimal bit and energy allocations. The number of iterations can be as small as 1, depending on the channel/noise condition (for example, see ratings 1 through 7 in Table 2).

Example 3

Figure 5:
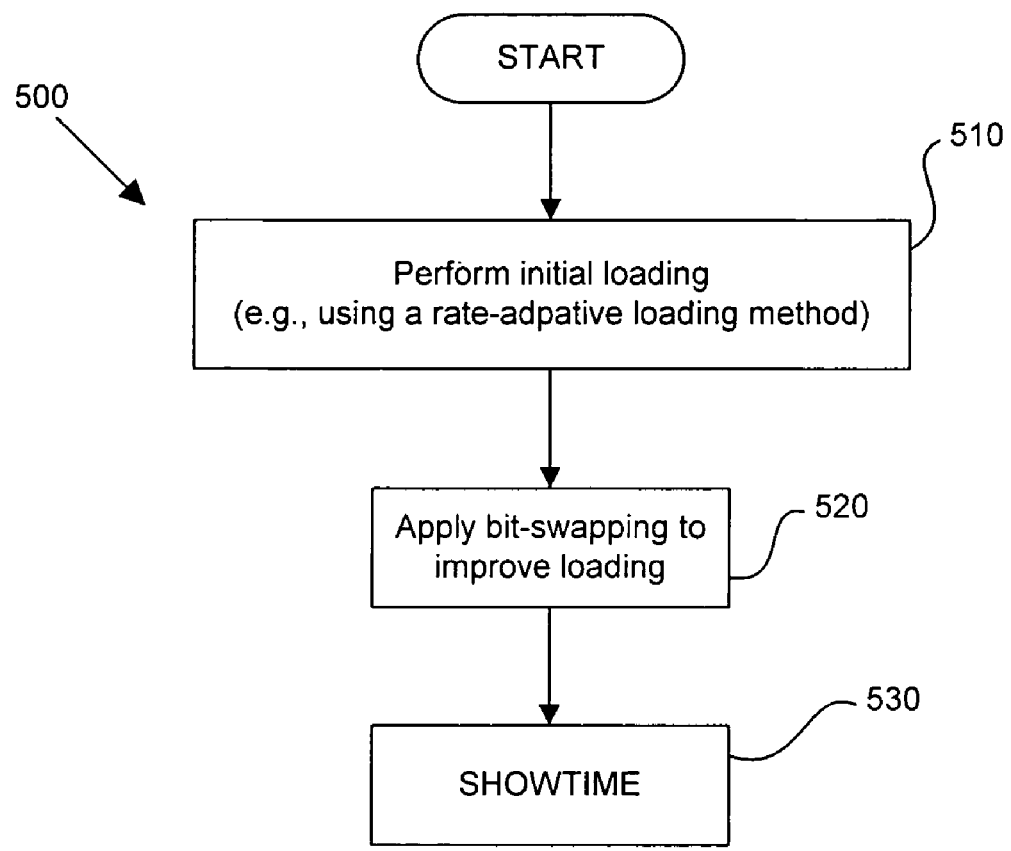
FIG. 5 is a flow diagram illustrating one or more single-line loading methods according to embodiments of the present invention helping to illustrate Example 3.

Another technique according to embodiments of the present invention uses bit swapping during loading, one example of which is illustrated by Example 3. FIG. 5 also illustrates one or more method embodiments 500 related to Example 3. In existing DSL systems, bit swapping is used only during SHOWTIME, typically to maximize the minimum margin over all tones. In some embodiments of the present invention, bit-swapping is used during the final part of the loading process, before entering SHOWTIME, to maximize (or at least improve) margin in case bit loading was not optimal.

Any suitable loading sub-method 510 is used first to find an initial bit and energy loading. Before entering SHOWTIME at 530, a bit-swapping sub-method 520 (for example, the Levin-Campello methodology, well-known to those skilled in the art) is applied to maximize (or at least improve) the minimum margin over all tones. For example, using the simple loading method of Example 1, above, as sub-method 520, 1 bit will be assigned to tone 2. A bit-swapping sub-method or other process will move the poorly-assigned bit to tone 1 before entering SHOWTIME 530, thus achieving the optimal bit allocation.

Example 4

Figure 6A:
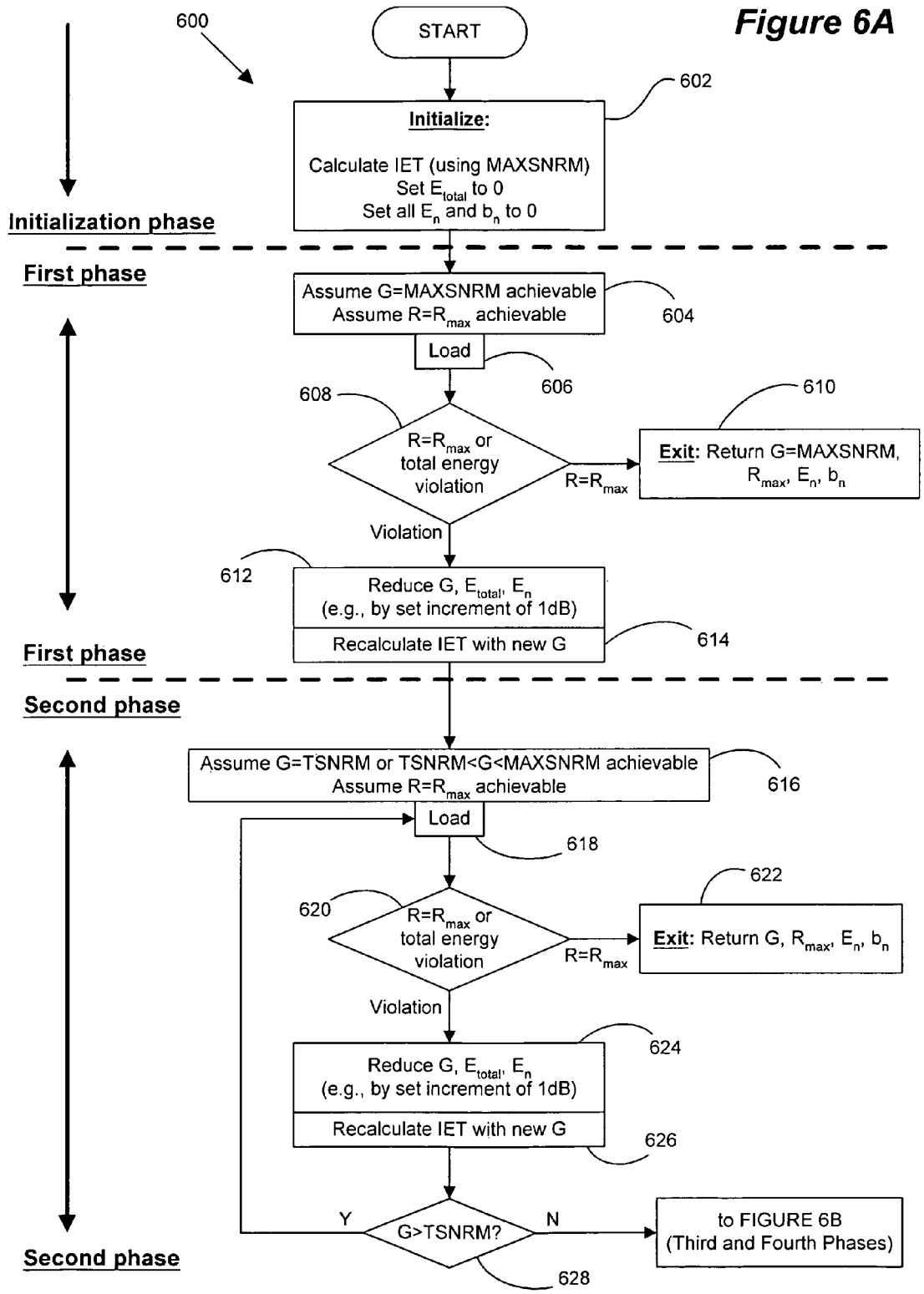
FIGS. 6A and 6B are flow diagrams illustrating one or more single-line loading methods according to embodiments of the present invention.
Figure 6B:
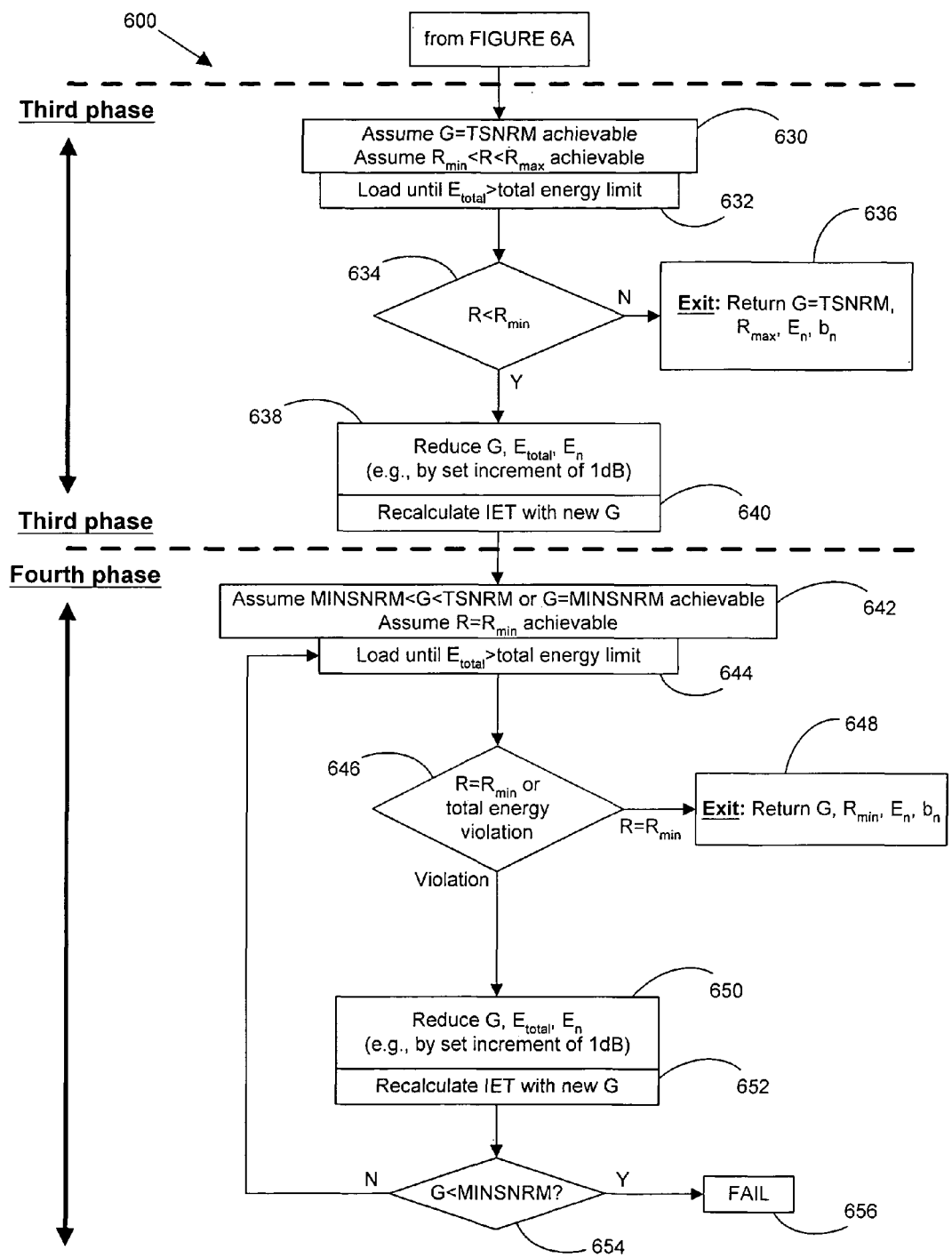

Another technique according to embodiments of the present invention uses adaptive margin updating during loading, one example of which is illustrated by Example 4. FIGS. 6A and 6B also illustrate one or more method embodiments 600 related to Example 4 (note that, in the example of FIGS. 6A and 6B, variable G has been substituted for variable $\gamma$ in the discussion below). A margin-adaptive loading process may need to be altered when a PSDMASK or the like is not flat, because loading based on an incremental energy table with a relatively smaller margin than what is achievable might assign bits to tones with stringent PSDMASK constraints too aggressively. This can result in relatively lower margins than what would otherwise be possible (for example, the method of Example 1). According to this aspect of the present invention, one embodiment of margin-adaptive loading uses an iterative method, similar to that found in Example 2, above. In the following example, adjustment of an achievable margin value $\gamma$ is used (for example, instead of TSNRM).

A. Initialization (see, for example, 602 of FIG. 6A):
 (1) Calculate incremental energy table using $\epsilon=2.8\times10^{0.98+(MAXSNRM-CODGAIN)/10}$ (MAXSNRM is used instead of TSNRM)
 (2) Set $E_{total}$ to 0
 (3) Set all $E_n$ and $b_n$ to 0 for all $n=n_1 \ldots n_N$ (n is DMT tone index, $n_1$ is the first tone, $n_N$ is the last tone, N tones are under consideration for loading)
 (4) Set $\gamma$, presumed value of achievable margin, to MAXSNRM B. First Phase (see, for example, steps 604-614 of FIG. 6A):
 Loading assuming that $\gamma$=MAXSNRM and R=$R_{max}$ are achievable.
 Add each bit successively to the tone that has the minimum incremental energy ($\Delta E_n(b_n+1)$) over all tones. If PSDMASK or BITCAP is violated for a tone by adding additional bit, then $\Delta E_n(b_n+1)$ is considered to be infinite for that tone. Whenever a bit is added, increase $E_{total}$ by $\Delta E_n(b_n+1)$. Continue until one of the two stopping criteria below is met:
  (1) $R_{max}$ has been achieved: Exit and return $\gamma$, $R_{max}$, $E_n$ and $b_n$.
  (2) $E_{total}$ exceeds MAXNOMATP by adding an additional bit: Then MAXSNRM cannot be achieved, and $\gamma$ should be adjusted to a lower margin value. Reduce $\gamma$, $E_{total}$ and $E_n$ by $\Delta\gamma$ (for example, 1 dB), and recalculate incremental energy table using the reduced $\gamma$. Because $\gamma$ was reduced, less energy is required for loading bits, and more bits may be loaded in each tone where PSDMASK is fixed. Therefore, incremental energy table will likely allow additional bits to be loaded. Move to second phase.

C. Second phase (see, for example, steps 616-628 of FIG. 6A): Loading assuming that TSNRM$\leq\gamma<$MAXSNRM and R=$R_{max}$ are achievable.
 Add each bit successively to the tone that has the minimum $\Delta E_n(b_n+1)$ over all tones. If PSDMASK is violated for a tone by adding additional bit, then $\Delta E_n(b_n+1)$ is considered to be infinite for that tone. Whenever a bit is added, increase $E_{total}$ by $\Delta E_n(b_n+1)$. Continue until one of the two stopping criteria below is met:
  (1) $R_{max}$ has been achieved: Exit and return $\gamma$, $R_{max}$, $E_n$ and $b_n$.
  (2) $E_{total}$ exceeds MAXNOMATP by adding an additional bit: Then $\gamma$ cannot be achieved, and $\gamma$ should again be adjusted to a lower margin value. Reduce $\gamma$, $E_{total}$ and $E_n$ by $\Delta\gamma$ (for example, 1 dB), and recalculate incremental energy table using the reduced $\gamma$. Because $\gamma$ was reduced, less energy is required for loading bits, and more bits may be loaded in each tone where PSDMASK is fixed. Therefore, incremental energy table will likely allow additional bits to be loaded. Restart this second phase if $\gamma>$TSNRM, otherwise move to third phase.

D. Third phase (see, for example, steps 630-640 of FIG. 6B): Loading assuming that $\gamma$=TSNRM and $R_{min}<R<R_{max}$ are achievable.
 Add each bit successively to the tone that has the minimum $\Delta E_n(b_n+1)$ over all tones. If PSDMASK is violated for a tone by adding additional bit, then $\Delta E_n(b_n+1)$ is considered to be infinite for that tone. Whenever a bit is added, increase $E_{total}$ by $\Delta E_n(b_n+1)$. Continue until the stopping criterion below is met:
  (1) $E_{total}$ exceeds MAXNOMATP by adding an additional bit:
   (a) If $R\geq R_{min}$, exit and return $\gamma$=TSNRM, R, $E_n$ and $b_n$.
   (b) Otherwise, $R_{min}$ cannot be achieved for $\gamma$=TSNRM. Reduce $\gamma$, $E_{total}$ and $E_n$ by $\Delta\gamma$ (for example, 1 dB), and recalculate incremental energy table using the reduced $\gamma$. Because $\gamma$ was reduced, less energy is required for loading bits, and more bits may be loaded in each tone where PSDMASK is fixed. Therefore, the incremental energy table will likely allow additional bits to be loaded. Move to fourth phase.

E. Fourth phase (see, for example, steps 642-656 of FIG. 6B): Loading assuming that MINSNRM$\leq\gamma<$TSNRM and R=$R_{min}$ are achievable.
 Add each bit successively to the tone that has the minimum $\Delta E_n(b_n+1)$ over all tones. If PSDMASK is violated for a tone by adding additional bit, then $\Delta E_n(b_n+1)$ is considered to be infinite for that tone. Whenever a bit is added, increase $E_{total}$ by $\Delta E_n (b_n+1)$. Continue until one of the two criteria below is met:

(1) $R_{min}$ has been achieved: Exit and return γ, $R_{min}$, $E_n$ and $b_n$.

(2) $E_{total}$>MAXNOMATP by adding an additional bit: Reduce γ, $E_{total}$ and $E_n$ by Δγ (for example, 1 dB), and recalculate incremental energy table using the reduced γ. Move to fourth phase if MINSNRM≦γ, otherwise exit and return LOADING_FAILED (that is, even for MINSNRM, the minimum data rate requirement $R_{min}$ cannot be achieved).

Unlike the exemplary sub-method with iterations, the last sub-method does not require multiple trials of independent loading. Even though the margin value γ is adjusted as the sub-method progresses, the bit allocation from the previous step is kept and only additional bits are added to see if the loading is complete or not.

In the first phase of Example 4, MAXSNRM is assumed to be achievable, and bits are loaded using an incremental energy table that was calculated assuming that MAXSNRM was an achievable margin value. If loading achieves $R_{max}$ without violating the MAXNOMATP condition, loading stops and returns the achieved bit and energy distributions.

If bit loading stops before achieving $R_{max}$, then the achievable margin assumption is reduced by Δγ and the now-loadable additional bits (that had caused the bit loading to stop due to a PSDMASK and/or MAXNOMATP violation, for example) are loaded to see if $R_{max}$ can be achieved. Δγ typically is chosen as 1 dB. However, for example, a larger value may be selected if the loaded data rate is much smaller than $R_{max}$. Such a larger choice of Δγ expedites the process. After reducing the margin assumption, the existing bit and energy allocations achieved up to the previous step are used as a continuation point (rather than restarting loading from the first bit), and additional bits are allocated. If certain conditions are met according to Table 1, then the process is completed. Otherwise, it continues with a smaller value of γ.

In some embodiments of the present invention, it may be desirable to perform at least two rounds of channel/noise identification and bit-loading. In the first round, all tones are sounded at nominal power levels (that is, all tones transmit at nominal power levels). This implies that distortion and other signal-dependent effects such as ISI are strong. A first round of bit-loading may take place using the methodology described previously, where some of the tones will be assigned to 0 bits and 0 gains, or possibly to 0 bits and some small gains below the nominal power levels (monitored tones). In the second round, tones are sounded using the gain allocations from the previous bit loading procedure. The distortion effects with the fewer tones may be smaller, which potentially increases the SNR on some tones. A second round of bit-loading can then take place using the more accurate information from the second round of channel/noise identification. The above procedure can be extended to more than 2 rounds.

In so proceeding, embodiments of the present invention find the optimal bit and energy allocation, where margin is guaranteed to be the same or comparable over all loaded tones, for any shape of the PSDMASK or any analogous constraint. As will be appreciated by those skilled in the art, this methodology can be applied to other DSL systems, parameters and situations. Moreover, these methods can be applied to other communication systems in some cases, as will be appreciated by those skilled in the art.

In some implementations of DSL modems, a value such as $minE_n$ might limit the minimum transmit energy per tone. In such cases, $E_n$ can be adjusted after loading is completed so that $E_{n,new}=\max(minE_n, E_n)$. Otherwise, $minE_n$ can be directly reflected in any appropriate incremental energy table.

Profile-limited loading according to the present invention can replace all of the margin-adaptive, rate-adaptive and fixed-margin methodologies previously required and/or used. When a margin-adaptive system is desired, TSNRM can be set to a sufficiently large number. When a rate-adaptive system is desired, $R_{max}$ can be set sufficiently high while MAXSNRM and MINSNRM can both be set to TSNRM. When, a fixed-margin system is desired, loading can be used with a proper MAXSNRM because it naturally implements a fixed margin. Profile-limited loading techniques according to the present invention provide optimal or near-optimal bit and energy allocations, regardless of the PSDMASK shape or other power-spectral-density requirements and/or parameters.

In a multi-user/multi-line vectored DSL system, just as in a single-line loading situation, each line u in a one-sided vectored DSL system (for example, with U lines, each having N tones) has its own profile constraints where parameters such as $MAXSNRM_u$, $TSNRM_u$, $MINSNRM_u$, $R_{max,u}$, $R_{min,u}$, $PSDMASK_u$, $MAXNOMATP_u$, $MAXNOMPSD_u$, $MAXRXPWR_u$, $CARMASK_u$, $RFIBANDS_u$, and $PSDREF_u$ (for upstream power back-off) must be satisfied. Some users might be able to achieve $MAXSNRM_u$ and $R_{max, u}$, while others might only be able to achieve $TSNRM_u$ and $R_{min,u}$.

In many earlier systems, only rate optimization for given power constraints or power optimization for given rate constraints has been considered. Even for the best of these earlier methods, optimal spectra have been found only though complicated convex optimization programs, except when the rate sum is maximized. Where rate and margin ranges are specified for U lines, finding the optimal solution is extremely difficult, especially when attempting joint optimization of PSD, ordering, bit allocation and the resulting rates and margins.

Embodiments of the present invention provide a computationally feasible method where PSD, ordering and bit allocation are calculated iteratively. An independent iteration can be used during ordering optimization (also referred to herein as "order swapping") to reduce the complexity of the overall methodology.

When all lines can be trained together, three line-characterizing and/or service-characterizing parameters need to be determined to complete loading:

power spectral density (PSD);

Ordering of decoding and/or precoding; and

Bit allocation to each tone of each and every user.

It is possible to determine all three factors jointly, but finding the optimal solution in that manner is highly complex.

Figure 7:
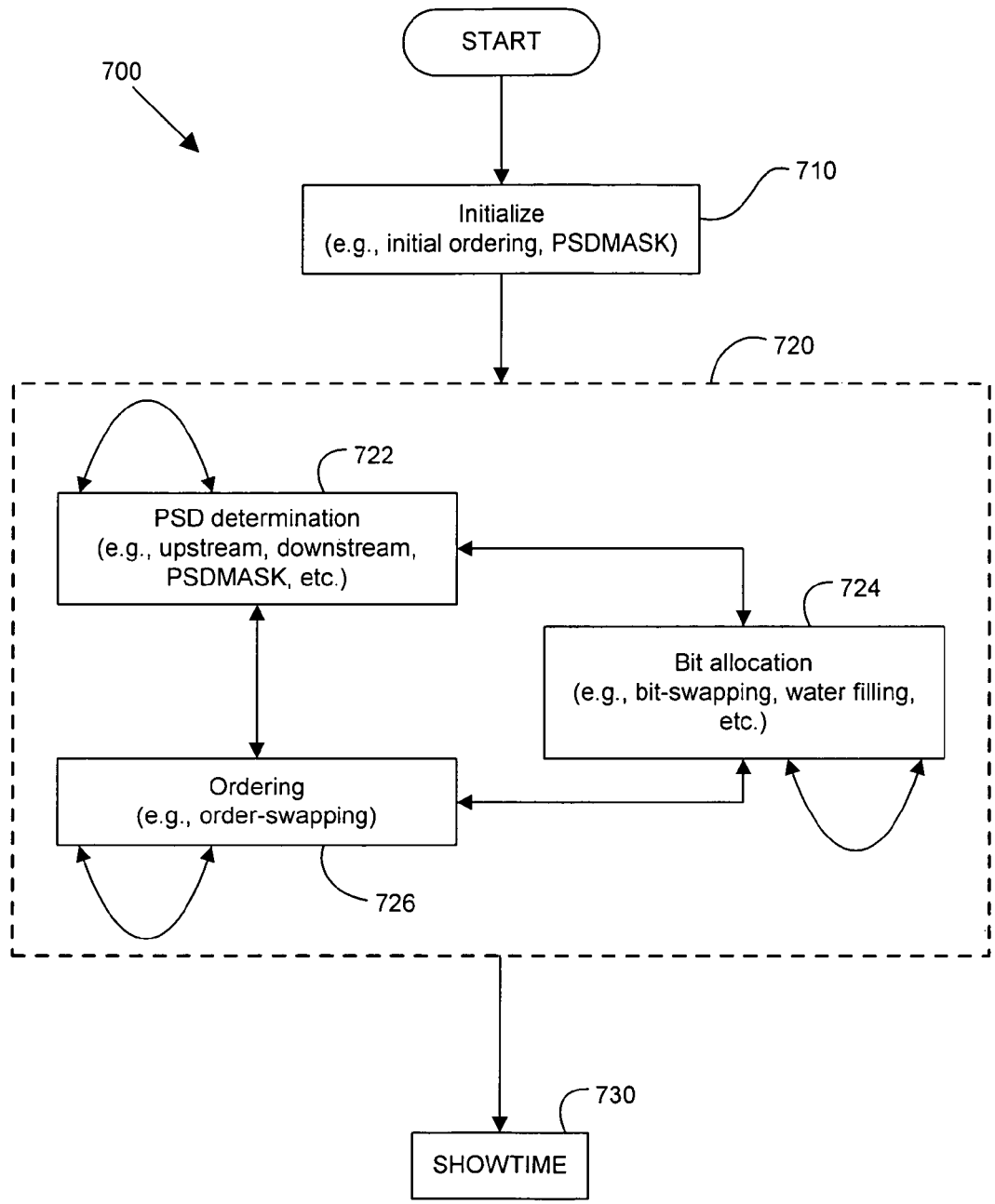
FIG. 7 is a flow diagram illustrating one or more embodiments of multi-user loading according to one or more embodiments of the present invention.

Methods according to the present invention sequentially determine PSD, ordering and bit allocation and thus are simpler than the joint determination problem mentioned above. One illustration of a method 700 according to embodiments of the present invention is shown in FIG. 7. As seen in FIG. 7, after initialization at 710, an optimization 720 includes the sequence of the three steps of PSD determination, bit allocation and ordering may be varied (for example, they can proceed as ordering, PSD and bit allocation). In some cases, ordering 726 may be seen as normally needing to come first, after which PSD 722 and bit allocation 724 can be implemented. However, ordering may be changed if the initial results are undesirable, in effect cycling through these steps (perhaps several times) with ordering changes resulting in energy and/or bit allocation changes. Generally, any sequence can be used so long as the initial or existing PSD and ordering are given before entering the bit allocation phase. In some cases, it may be desirable to execute the sequence more than once in order to complete loading and enter SHOWTIME at 730. In fact, generally, one or more steps 722, 724, 726 can be repeated, as needed, while sequentially performing the processing of 720.

When PSD is decided and fixed for all users first, all the tones then decouple, thus allowing simple methods to be used for ordering. Once the ordering is decided, the SNR of each user's tone then is determined, and slightly modified single-user loading can be used to determine bit allocations. A controller such as a DSL optimizer can always execute loading as if all lines can be trained together, then subsequently determine how to implement the results if some lines are already active. However, the individual lines can perform loading without the knowledge of the controller. Each line receives a bit rate and any PSD constraints from the controller and does not know its position in the selected order. The line then runs its loading initially, or continuously during operation (often known as "bit swapping") to ensure the bit rate and energy constraints are met. The line's loading implementation does not know the order. The controller does know the order and determines the bit and energy constraints for each line based on the order it assigned to a set of lines (on each tone). As noted above, in some embodiments of the present invention, PSD (or $E_{u,n}$, the energy allocated to tone n of user u) is determined first. Because vectoring is done at the CO side, upstream and downstream structures are different.

For the upstream structures, when total energy (for example, MAXNOMATP) is the limiting constraint, one method of determining PSD is to run iterative water-filling for the vectored multiple-access channel so that sum rate (also referred to in the art as "rate sum" and the like, which is the sum of the data rates of all the users) is maximized. When PSDMASK is the limiting constraint, then the PSD can be chosen to be same as the PSDMASK. When one or more users require higher priority than other users to achieve rate goals, then each preferred user's spectrum can be optimized ahead of other users (the preference of preferred users determining the order of optimization of preferred users, for example). Iterative water-filling also can be executed with a given set of rates or a rate-tuple for the users, where each line executes fixed-margin water-filling with noise originating from non-vectored users and vectored users that are not cancelled for the given line. In this case, the best ordering on any and all tones is to place the user with highest data rate in the most favorable position (that is, last, where all other users are canceled). When the ordering of users is already fixed, then the PSD may be optimized with the given ordering.

For upstream structures, another method of determining PSD is to solve a problem of achieving a given set of user data rates specified by a rate-tuple while minimizing a weighted sum of user energies, or while satisfying an energy vector constraint. Solutions to these problems are known to those skilled in the art (for example, Sections 13.4 and 13.5 of the Chapter 13 notes for course EE479 taught at Stanford University during Fall 2005; said Chapter 13 is incorporated herein by reference in its entirety for all purposes).

In situations known as "row-dominated" (upstream) or "column-dominated" (downstream) situations that occur in vectored systems using only differential excitation (that is, specifically, no phantoms nor split-pair modes are excited), then any order can typically be used if the noise is white on all lines and uncorrelated from line to line. In all cases, however, unnecessarily large energy might be assigned using any of the above single-line loading approaches where iterative water-filling or PSD equal to PSDMASK is used. In using the term "iterative water-filling" here, it is understood that the actual methodology may be one that adds bits for any user to the positions of lowest incremental energy cost. Such a lowest-incremental-cost loading, when independently run by all lines, is known to converge. This convergence occurs even when other lines are simultaneously changing their spectra by using the same type of loading methodology.

Methods according to the present invention can reduce transmit power and compel politeness toward the lines that are not included in the vectoring system as well as the lines that are included in the vectoring system:

MAXNOMATP or PSDMASK may be properly adjusted before determining PSD. One method uses an expected margin from previous operation or from previous execution of a loading method or sub-method. Small adjustments to this expected margin can be made at each time, and the method will converge after multiple vector trainings.

In the bit allocation explained below, unnecessary power that makes margin larger than MAXSNRM may be omitted.

In the SHOWTIME order-swapping method or system model below, unnecessary power that makes margin larger than MAXSNRM may be dropped.

For the downstream structures, duality results known to those skilled in the art can be used to map any downstream broadcast ("BC") channel into an equivalent multiple-access channel (for example, Section 14.5 of the Chapter 14 notes for course EE479 taught at Stanford University during Fall 2005; Chapter 14 is incorporated herein by reference in its entirety for all purposes). The PSD allocation discussed above with regard to upstream PSD can be used on such a dual multiple-access channel before mapping it back to the original broadcast channel. When MAXNOMATP is the limiting constraint, one method of determining the PSD is to run iterative water-filling with a sum-power constraint for the dual vectored multiple-access channel so that the rate sum is maximized. When PSDMASK is the limiting constraint, then PSD can be chosen to be same as the PSDMASK. When one or more users' rate goals have priority, then those users' spectra can be optimized before the other users. When ordering of users is already fixed, then the PSD may be optimized with the given ordering. In all cases, un-necessarily large energy might be assigned and the methods used in connection with upstream issues, discussed above, can reduce transmit power and compel/enforce politeness on lines both included and not included in the vectoring system.

An illustrative PSD determination method is presented here. The duality between a broadcast channel and its equivalent multiple-access channel is used with an iterative water-filling method that maximizes rate sum. As is well known to those skilled in the art, a dual multiple-access channel is used instead of the original broadcast channel for PSD determination because the multiple-access channel PSD optimization problem is convex. Therefore, a computationally efficient method such as iterative water-filling can be used. Once the set of PSDs is determined for the multiple-access channel, the corresponding PSD of the broadcast channel can be found using well known equations/techniques.

The duality transformation can be described as follows for a communication system with U users. The vector of channel outputs at the different downstream receiver locations can be written as $$y = H^*x + n = \begin{bmatrix} h_1^* \cdot x + n_1 \\ h_2^* \cdot x + n_2 \\ \vdots \\ h_U^* \cdot x + n_U \end{bmatrix} \quad \text{Eq. (2)}$$

where $h_u^*$ is the $u^{th}$ row of $H^*$ ($h_u$ is the $u^{th}$ column of H) and represents the vector transfer of a U×1 vector input symbol x. The tone index is dropped for this equation, which independently applies to all tones in a vectored DMT system, with all entities indexed by the tone also.

The vector input x can be construed as the sum of the U input vectors corresponding to each of the users $$x = \sum_{u=1}^{U} x_u \quad \text{Eq. (3)}$$

Each user's vector input symbol has an autocorrelation matrix that is $$R_{xx}(u) = E[x_u x_u^*] \quad \text{Eq. (4)}$$

and the overall autocorrelation is $$R_{xx} = \sum_{u=1}^{U} R_{xx}(u) = E[xx^*] \quad \text{Eq. (5)}$$

This vector symbol of user u has total energy $E_u^{BC} = \text{trace}\{R_{xx}(u)\}$. The dual system forms the multiple-access channel $$y = Hx + n = \sum_{u=1}^{U} h_u \cdot x_u + n \quad \text{Eq. (6)}$$

To determine the PSD that maximizes sum rate, iterative water-filling is applied to the multiple-access channel. In each step of iterative water-filling, a user's transmit power $E_u^{MA}$ is updated using any suitable single-user water-filling methodology (including those described above and/or any others known to those skilled in the art). In the original water-filling methodology, the process continues to the next user or next set of iterations after finding $E_u^{MA}$. For the problem under consideration here, however, the determined transmit power must be examined to see if the corresponding broadcast channel transmit autocorrelation matrix $R_{xx}(u)$ satisfies the power constraints. The multiple-access energy constraints for each user of the dual channel are found by first computing the following scalar and matrix (these equations are understood to be for each tone and the given current order of users):

$$\text{Matrix } A_u = 1 + h_u^* \left( \sum_{i=1}^{u-1} R_{xx}(i) \right) h \quad \text{Eq. (7)}$$

$$\text{Scalar } B_u = I + \left( \sum_{i=u+1}^{U} h_i \cdot h_i^* E_i^{MA} \right) \quad \text{Eq. (8)}$$

These two quantities for any index u are only a function of users who occur earlier in the ordering (that is $A_u$) or of users who occur later in the ordering (that is $B_u$). At a controller (such as a DSL optimizer), only one fixed-margin water-filling is executed for user u on any given iteration and the others' $R_{xx}(i \neq u)$ are known from previous iterations or from initialization (typically zero for an initial value). Such a fixed-margin execution uses a table of incremental energies for loading, as is well known. This table will contain the incremental energy required to load each additional bit on the tone with infinite incremental energy in those entries that would cause either the downstream PSDMASK constraint for that tone or the BITCAP for that tone to be exceeded. This incremental energy table also is a function of the other users' autocorrelation functions $R_{xx}(i \neq u)$ through the following relation for each u $$R_{xx}(u) = B_u^{-1} A_u E_u^{MA} \quad \text{Eq. (9)}$$

and therefore $$E_u^{BC} = \text{trace}\{R_{xx}(u)\} = \text{trace}\{B_u^{-1} A_u E_u^{MA}\} \quad \text{Eq. (10)}$$

On any given iteration only user u's equation is used to construct the incremental energy table, using the known $A_u$, $B_u$ and $E_u^{BC}$ constraints for each and every tone. The incremental energies will be for the equivalent dual multiple-access channel but will reflect the energy constraints for the broadcast channel.

The above quantities $B_u$ can only be successively computed (that is, in order-index only) using results from the previous margin-adaptive dual-energy calculation, which are updated and available after each iteration as u decreases from U to 1. As the energy of the dual multiple-access channel is incremented on each tone by adding another bit, the energy for the given rate tuple is minimized for that particular user using fixed-margin loading and given all the other users' current $R_{xx}(i \neq u)$. The bit rate for each and every user on the dual multiple-access system equals the corresponding bit rate for that same user on the original BC channel. This procedure also is known to converge and will produce minimum energy for the given order on all users to obtain the given rate tuple. Once the procedure produces a set of energies $E_u^{MA}$ for all tones of each user, Equation (9) can be used to get the actual downstream PSD values and autocorrelation matrices for each and every tone of every user for the given order.

When cascades of bonded and single-sided users are present, the well-known duality procedure is somewhat more complicated, but still known and apparent to those skilled in the art. The procedure can be applied to such situations. Basically, both of the $A_u$ and $B_u$ above become matrices, and a well-known equation more complicated than Equation (9) needs to be used.

To be standards-compliant in any DMT DSL system, the downstream receiver must determine the bit distribution. Therefore, centralized loading according to the present invention can be performed by a controller such as a DSL optimizer only to determine initial energy (for example, PSDMASK) settings and overall data rates for each and every tone of every user and the ordering(s) for all tones, which ordering may then affect certain aspects of the DSL system (for example, complex rotor units (when used in lieu of matrix multiplication, such as implementing a Q matrix or the like) and/or precoder/decoder implementations). The individual lines can then load and swap, allowing later bit distributions on the lines to differ from the original used by the controller to initially set the PSDMASKs and order. This is acceptable and advisable in practice because the overall objective is to determine the order along with the PSDMASK and energy settings, rather than to attempt impractical centralized loading.

Once the PSDs of all lines have been determined (for example, by one of the procedures for upstream or through duality for downstream above), there are only a few further differences between upstream and downstream vectored loading. Generalized decision feedback equalization (sometimes referred to as "GDFE" or "successive decoding") can be used for upstream in some embodiments, and preceding can be used for downstream in some embodiments. Techniques, etc. for GDFE implementation can be found in U.S. Ser. No. 11/336,113, entitled "Adaptive GDFE" and filed Jan. 20, 2006, which is incorporated by reference herein in its entirety for all purposes. Techniques, etc. for preceding implementation can be found in U.S. Ser. No. 11/336,666, entitled "Tonal Precoding" and filed Jan. 20, 2006, which is incorporated by reference herein in its entirety for all purposes.

Upstream—Error propagation is not a major problem for a GDFE because it can reset on each DMT symbol for each and every tone. Nonetheless, reducing error propagation will improve the line stability. Therefore, it may be beneficial for upstream to use the same ordering on all tones so that all the trellis-coded DMT tones can be decoded before any subtraction. If ordering is different across the tones, then a user's bits after a decision device need to be used for subtraction before the user's bits have chance to pass a Viterbi decoder. Some systems may presume that the ordering is the same on all tones for best performance with minimum summed power. This may be reasonable or even optimum in some cases, but it is not presumed in connection with each and every embodiment of the present invention. Moreover, even if the ordering is the same on each tone, this single ordering still must be determined. In a GDFE receiver, if the same ordering is used in all tones, the output from the decoder can be used (rather than the output from a decision box) for the subtraction of signals. If the same order is used in all tones, the first user's signal from all tones can be passed through the decision box, the results can be passed to decoder, and the decoded results can be used for subtraction such that the next user can repeat the decoding process. If the same order is not used, this is not possible and each tone will need to follow its own ordering for subtraction/decision. When output from the decoder is used for subtraction, error is less likely and the overall performance (for example, bit-error rate or BER) can be reduced, as will be appreciated by those skilled in the art. On the other hand, the same ordering constraint might exclude one or more rate-tuples from being chosen. Therefore, there is a tradeoff between choosing the same ordering and choosing mixed-ordering (that is, an ordering that does not have the same ordering in all tones), and one of the two can be chosen adaptively according to embodiments of the present invention.

Downstream—Precoding requires modulo operation, and thus a small energy penalty needs to be reflected in the energy table. There is no such penalty for upstream. Also, modulo operation needs to be supported at both sides for downstream (for example, at a DSLAM and CPE), while the upstream vectored receiver does not need modulo operation. For downstream, the precoder's modulo subtraction is implemented at the encoder side so there is no error propagation; the subtraction used during precoding is thus effectively guaranteed to be error-free.

Except for the two small effects noted above, both upstream and downstream are quite similar in the sense that sum rate is not affected by ordering and only the distribution of the sum rate to individual lines is affected. Therefore, common ordering methods that can be applied to both upstream and downstream are usable in connection with the present invention.

Figure 8:
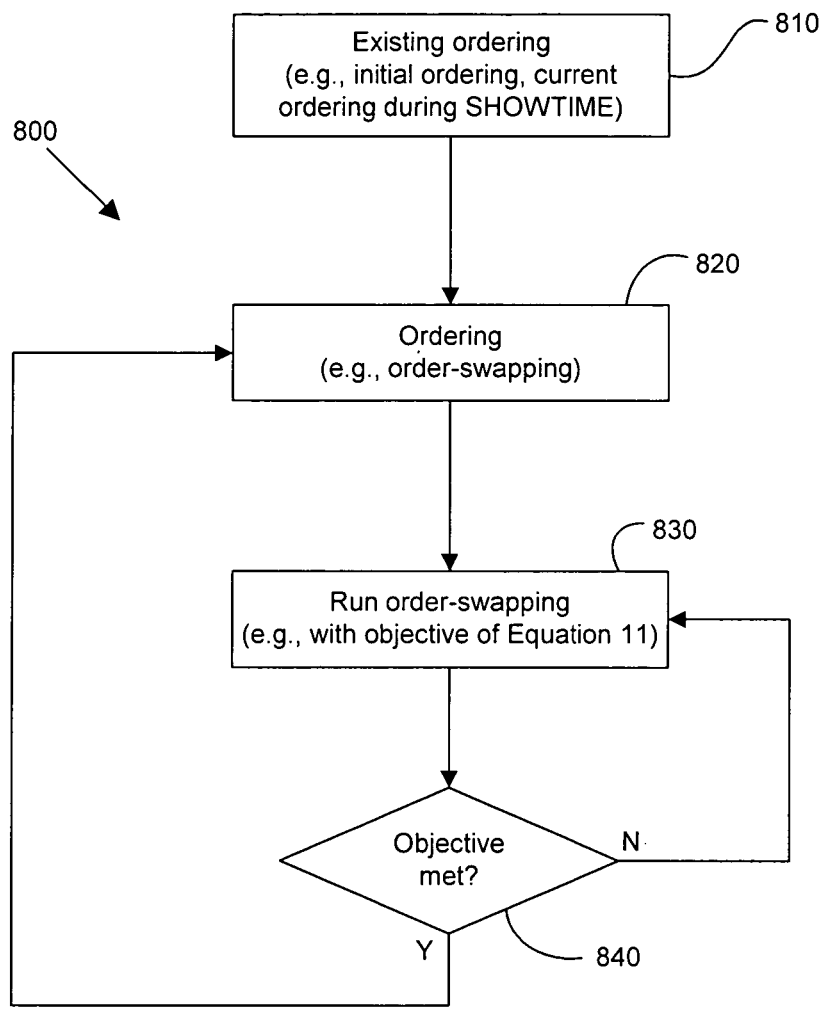
FIG. 8 is a flow diagram illustrating one or more embodiments of order-swapping usable with embodiments of the present invention.

One example of a method 800 according to embodiments of the present invention is shown in FIG. 8, which begins with an existing ordering at 810 (for example, an initial ordering or a current ordering during SHOWTIME). As explained above, the constraints for each user are expressed via a profile where parameters such as MAXSNRM, TSNRM, $R_{max}$, $R_{min}$, PSDMASK, MAXNOMATP, MAXNOMPSD, MAXRXPWR, CARMASK, RFIBANDS, and PSDREF (for upstream power back-off) are specified. While the true bit allocation will be explained below, a simple assumption can be made for the sake of initial ordering where the maximum number of bits possible is loaded in each tone for a given $E_{u,n}$, CARMASK, RFIBANDS, and TSNRM. Other constraints such as MAXSNRM, MINSNRM, $R_{max}$, $R_{min}$, PSDMASK, MAXNOMATP, MAXNOMPSD, MAXRXPWR, and PSDREF (for upstream power back-off) are thus initially ignored. Even though the true bit allocation that will be used during SHOWTIME is likely to be different, this assumption will allow implementation of a reasonable ordering initially. Basically, this assumption allows all of the lines to be compared fairly in the sense that their extra bits for TSNRM are compared and the deviations used for ordering.

As noted above, ordering 820, 830, 840 may have one or more objectives, goals, etc. For instance, the procedure may depend on a user-partitioning process that categorizes 3 types of users—under rate, above rate and at rate—and that follows each instance of a modified power-minimizing loading technique. For purposes of illustration herein, the following equation is used as the ordering objective:

$$\text{Minimize} \sum_{u=1}^{U} \left\| \frac{R_u}{R_{max,u}} - \frac{1}{U}\left(\sum_{u=1}^{U} \frac{R_u}{R_{max,u}}\right) \right\| \qquad \text{Eq. (11)}$$

where $R_u = 4 \cdot b_u$ Kbps for user u and $b_u$ is the number of bits loaded by user u. The rate equation $R_u = 4 \cdot b_u$ Kbps is correct for ADSL, but data rate might not be $4 \cdot b_u$ Kbps for VDSL, depending on the factors that affect the number of DMT symbols transmitted per second. If the length of cyclic prefixes is reduced from its normal value, then the 4 kHz multiple increases slightly. Also, if tone spacing of DMT is not 4.3125 KHz, but n*4.3125 KHz (n times faster sampling that corresponds to use of n times larger bandwidth) where n is an integer larger than 1, then the 4 kHz multiple changes to 4·n kHz multiple. Each rate vector entry in Kbps typically is an integer between $2^5$ and $2^{17}$ for each of the different users. Here, the stated goal attempts to equalize the emphasis placed on all users by maintaining constant ratios between achieved data rate $R_u$ and maximum target data rate $R_{max,u}$ for all users.

Any initial order is used for all the tones. A simple order starts with the user with the highest rate being last on all tones, the user with next highest rate being next-to-last in order, etc. Another starting order is to examine U! possible orderings where the same ordering is used over all tones, and then to choose the ordering that minimizes the stated goal. In fact, this method provides the optimal solution if the same ordering is to be used for upstream (as long as examining U! possible orderings does not require a heavy computation).

Order-swapping can then be implemented to improve the stated goal in Equation (11). As will be appreciated by those skilled in the art, any convergent sub-method can be used, one example of which follows:

```
Until no more swaps can occur,
    For tone n = 1:N,
        For order index m=1:U-1
            if (swapping order of m'th and m+1'th users is helpful for
            minimizing the total energy objective)
                {Swap order of m'th and m+1'th users}
            end
        end
    end
end
```

In case the same ordering is needed or being considered on all tones, and U! possible orderings were not examined for finding the starting order, the process can be modified to consider order swapping of all tones.

```
Until no more swaps can occur,
    For order index m=1:U-1
        if (swapping order of m'th and m+1'th users in all N tones is
        helpful for minimizing the objective)
            {Swap order of m'th and m+1'th users}
        end
    end
end
```

Some users or tones of some users might not need subtraction. Such users or tones may use only linear processing and no precoding/decision-feedback (that is, only the Q matrix in QR factorization is significant, equivalently R is close to a diagonal matrix). A controller such as a DSL optimizer can assess the need for a GDFE and/or precoding and adaptively include or exclude a user.

Once the PSD and orderings are determined for all tones, the incremental energy table can be constructed for each user with proper crosstalk reflected in it. Single-line loading then can be applied to each line independently so that the best rate and best margin can be achieved. The best margin can be achieved in this procedure by using one of the single-user loading methodologies that are described above.

Convergence of the methods or sub-methods may require several executions of the iterative water-filling and the "outer" order-swapping procedure before entering normal operation with bit-swapping. Based on the rates and margins that are achieved at the end of the earlier iterations of this procedure, the PSD and/or ordering of the users may already be sufficient and the recursions halted. A user with relatively low rate and/or margin compared to its rate and/or margin targets can be given a higher priority for determining PSD and/or ordering. Therefore, the ordering does not have to correspond to one in which the total used power by all users is minimized to achieve the given rates. Thus the criterion above for order selection may be altered and the one provided in Equation (11) is merely exemplary. The users will enter normal operation with the usual bit swapping when the final results on PSD and ordering have been communicated to the modems by the DSL optimizer.

Iterations can be continued the next time training is performed by a controller such as a DSL optimizer and a new set of PSDs and orders sent to the modems. Based on rate and/or margin records from previous operation, PSD and/or ordering can be adjusted.

Individual users can continue normal bit swapping after initial loading assigns bits and energy to each and every user. The order is not changed by these individual bit swappings, which may be in reaction to noise changes outside the vectored lines or possibly line changes over time (for example, temperature changes). Thus, VDSL modems can operate in a normal fashion to track time variation of the channel. During normal bit-swapping, however, the actual used PSD may be changed. A reducing PSD cannot harm other users, and thus is permitted. Increasing PSD, however, in response to a new, outside-vectoring noise on this line might result in a performance decrease on other lines, and thus may be forbidden. The TSNRM for the lines may thus need to be set sufficiently high to protect operation against such situations, which may be determined over a period of observation of the system.

Any two consecutively ordered users (or nonconsecutively ordered users in some implementations) can swap ordering during SHOWTIME, for example as might be indicated by a controller such as a DSL optimizer. The order of other components (for example, complex rotor units, decoding, precoding, etc.) may be changed. One example of this type of operation is illustrated in FIG. 8. Such an order change may result in different bit distributions for the individual users. As long as the change is within the range allowed by the TSNRM and does not exceed this range, normal swapping operation of the lines should eventually correct the bit distributions. A controller such as a DSL optimizer deciding the ordering could test such an on-line order change within its own internal simulations and calculations to make sure that such a change would not cause service disruption while the modems swap in normal operation to a new bit distribution. The new bit allocation can be pre-calculated and known to the controller, but must be executed at the time of normal swapping by the modems. For upstream vectored operation, it is possible that bit-swap commands could be simultaneously sent to the modems that would be affected by an order swap, although the express swapping or advanced swapping methods of VDSL systems would likely be necessary. Equivalently, while not allowed downstream in current standards, a proprietary mode of operation could allow multiple modems to swap at the same time.

Order swapping may be used to equalize margins of users, or may be used to move a user's ordering to the worst position so that the PSD can be increased without causing retraining. A simple method is provided below for equalizing margin where only two consecutively ordered users are considered for order-swapping.

Margin Equalization:
  Order swapping allowed for two consecutively ordered
      users if
      i. $\min(\Delta\gamma_1, \Delta\gamma_2, \ldots, \Delta\gamma_U)$ is increased, where
          $\Delta\gamma_u$=current margin of user u−TSNRM$_u$
      ii. Order swapping does not change any user's margin
          from $\Delta\gamma_u \geq 0$ to $\Delta\gamma_u < 0$
      iii. Order swapping does not reduce margin of any user
          who has $\Delta\gamma_u < 0$ A user's modem may need to retrain due to low margin, high bit error rate or change in line profile. If the user can retrain without causing retrains to other users in the vectored system, then the user may retrain with its orders in all tones the same as in the previous operation. If the user cannot perform a retrain without causing retrains to other users, then the user can be considered as a new user to the vector and follow procedures below for retraining.

Figure 9:
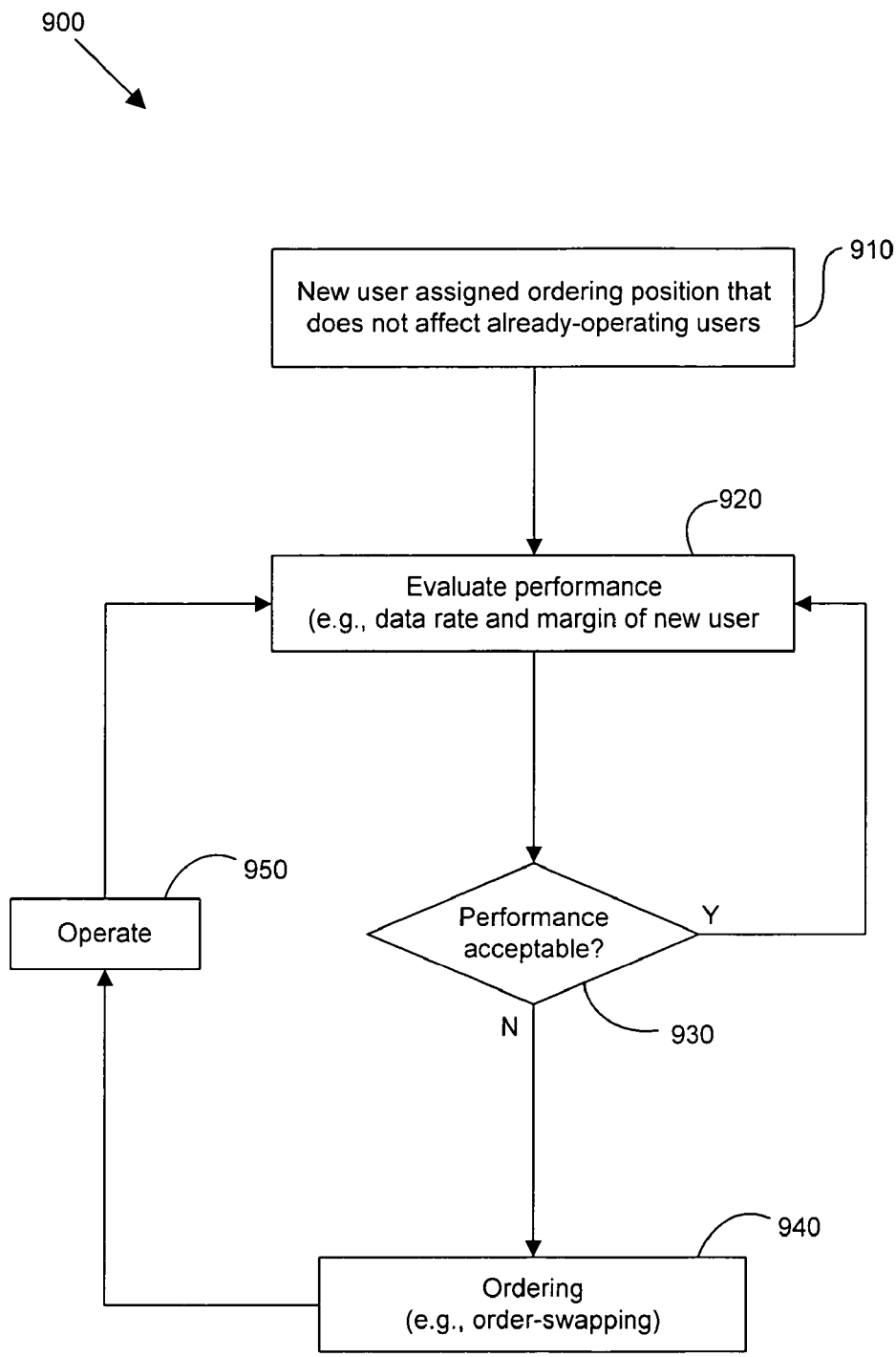
FIG. 9 is a flow diagram illustrating one or more embodiments of integrating a new user into a multi-user vectored system according to one or more embodiments of the present invention.

When a new user (or retraining existing user) is to be trained, joint training of all users in the vector is always an option. To reduce the number of overall trainings, the following method can be used, one embodiment of which 900 is shown in FIG. 9:

i. New user loads bits at 910 in the worst ordering position (other users not affected). If performance evaluated at 920 is satisfactory at 930, then exit.
ii. If a higher data rate is desired for the new user as determined at 930, then order swapping 940 during SHOWTIME can be used to improve the user's SNR in some or all tones during operation at 950. If the user needs further improvement in SNR to achieve its rate target, then the margin target can be temporarily increased so that an order swapping method using exemplary criterion Equation (11) can move the user's position within the order to a better position (keeping in mind that different orders may be present on different tones). Once a sufficiently large margin is achieved, the user can reset target noise margin to its normal value and then either retrain with a higher data rate with the same ordering and PSD or adapt rate (as in ADSL2 or VDSL2) with the same ordering and PSD.

The order when complex rotors are in use can be set by the order of decoding/precoding. Once that order is established on each tone, the QR (or RQ) factorization is executed for each and every tone, given that order. Such a QR factorization can be a step in determining new incremental-energy tables for loading in the modified bit-swapping method. Therefore, a new QR needs to be executed, for at least each tone investigated, to get the correct incremental energy tables for further evaluation after modified bit swapping. Any tone for which R is nearly diagonal means that the order is inconsequential on this tone and all users may be viewed as if no other crosstalk is evident. Thus, re-ordering will only apply to tones for which R is significant (that is, significantly non-triangular or non-diagonal). For many situations, there may be only a few such tones (for example, those affected by radio-frequency noise) to which order swapping can and should be applied.

Various apparatus according to the present invention can implement one or more of the methods and/or techniques discussed above. According to one embodiment of the present invention shown in FIG. 10A, a loading/ordering control unit 1000 (which may be responsible for single-line and multi-line training, as well as decoding/GDFE, preceding, channel and crosstalk detection and evaluation, etc. in some embodiments of the present invention) may be part of an independent entity coupled to a DSL system, such as a controller 1010 (for example, a device functioning as or with a DSL optimizer, DSM server, DSM Center or a dynamic spectrum manager) assisting users and/or one or more system operators or providers in operating and, perhaps, optimizing use of the system. (A controller or DSL optimizer may also be referred to as a DSM server, dynamic spectrum manager, Dynamic Spectrum Management Center, DSM Center, Spectrum Maintenance Center or SMC.) In some embodiments, the controller 1010 may be an independent entity, while in other embodiments the controller 1010 can be an ILEC or CLEC operating a number of DSL lines from a CO or other location. As seen from the dashed line 1046 in FIG. 10A, the controller 1010 may be in the CO 146 or may be external and independent of CO 146 and any company operating within the system. Moreover, controller 1010 may be coupled to and/or controlling DSL and/or other communication lines in multiple COs. In some embodiments of the present invention, the controller 1010 controls a vectored DSL system in a specific binder. The DSL lines in the binder may be ADSL, VDSL and/or other communication lines in various combinations.

The loading/ordering control unit 1000 has access (directly or indirectly) to information and/or data regarding the various lines in the subject binder and can control certain aspects of those lines' operation, including training and the like. This control may include controlling parameters that are specific to vectored systems (for example, tonal GDFE receiver parameters for upstream signal processing, tonal precoding parameters for downstream signal processing, ordering of users in precoding and/or decoding, parameters for training/tracking signals, etc.) as well as parameters that are common to both non-vectored and vectored systems and single-line operation (for example, PSD parameters, PSDMASK parameters, CARMASK parameters, TSNRM parameters, MAXSNRM parameters, data rate parameters, etc.).

Figure 10A:
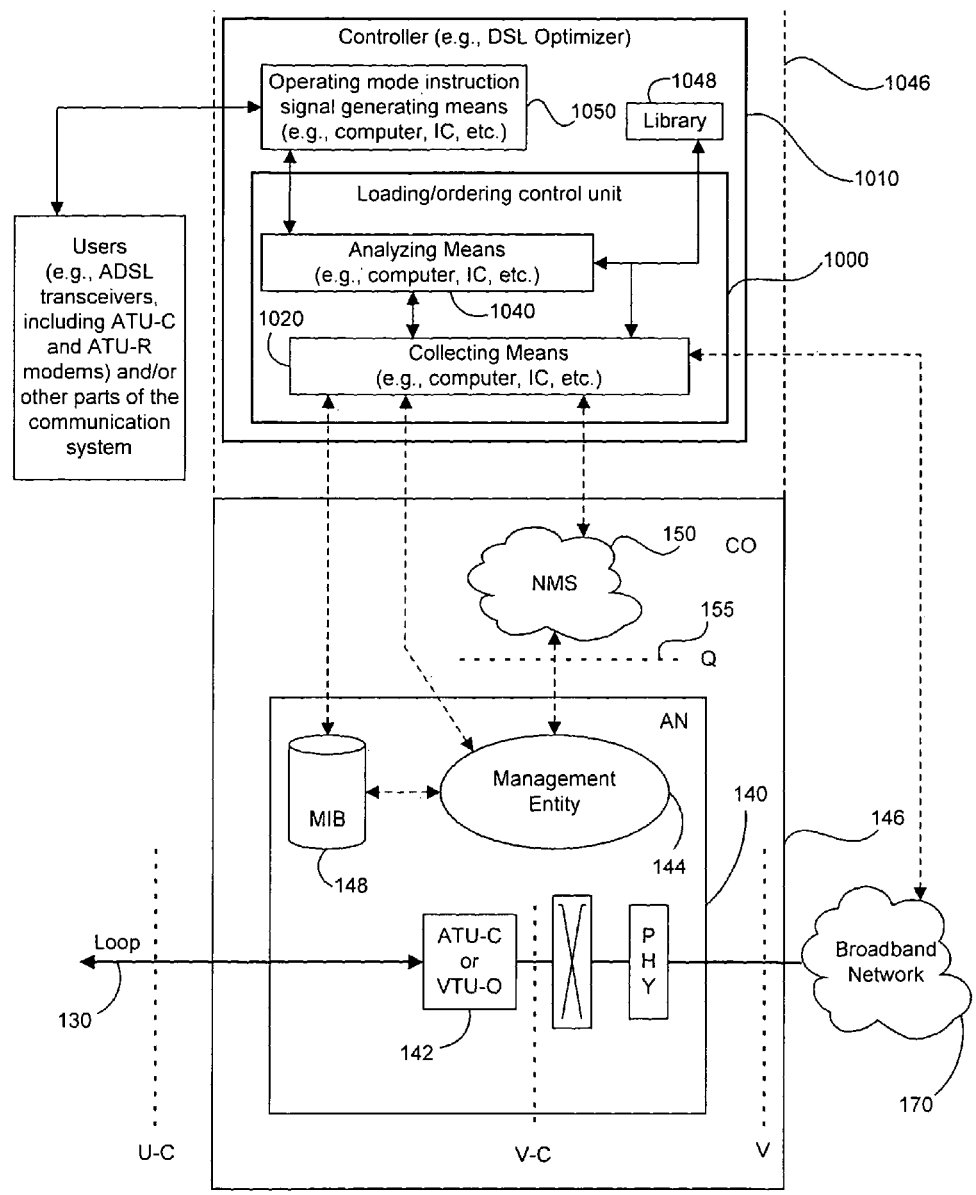
FIG. 10A is a controller including a DSL control unit according to one embodiment of the present invention.

The loading/ordering control unit 1000 includes a data collection unit 1020 identified as a collecting means and an analysis unit 1040 identified as analyzing means. As seen in FIG. 10A, the collecting means 1020 (which can be a computer, processor, IC, computer module, etc. of the type generally known) may be coupled to NMS 150, ME 144 at AN 140 and/or the MIB 148 maintained by ME 144, any or all of which may be part of an ADSL and/or VDSL system for example. Data also may be collected through the broadband network 170 (for example, via the TCP/IP protocol or other protocol or means outside the normal internal data communication within a given DSL system). One or more of these connections allows the DSL control unit to collect operational data from the system. Data may be collected once or over time. In some cases, the collecting means 1020 will collect on a periodic basis, though it also can collect data on-demand or any other non-periodic basis (for example, when a DSLAM or other component sends data to the state transition control unit), thus allowing the loading/ordering control unit 1000 to update its information, operation, etc., if desired. Data collected by means 1020 is provided to the analyzing means 1040 (which also can be a computer, processor, IC, computer module, etc. of the type generally known) for analysis and any decision regarding operation of a new DSL line, any vectored lines and any other systems of the type addressed by embodiments of the present invention. Moreover, analysis may include evaluating data for other purposes contemplated by other embodiments of the present invention, as will be appreciated by those skilled in the art.

In the exemplary system of FIG. 10A, the analyzing means 1040 is coupled to a DSLAM, modem and/or system operating signal generating means 1050 (which can be a computer, processor, IC, computer module, etc. of the type generally known) inside or outside the controller 1010. This signal generator 1050 is configured to generate and send instruction signals to modems and/or other components of the communication system (for example, ADSL and/or VDSL transceivers and/or other equipment, components, etc. in the system). These instructions may include commands limiting or otherwise controlling parameters that are specific to vectored systems (for example, tonal GDFE receiver parameters for upstream signal processing, tonal precoding parameters for downstream signal processing, ordering of users in precoding and/or decoding, parameters for training/tracking signals, etc.) as well as parameters that are common to both non-vectored and vectored systems (for example, PSD parameters, PSDMASK parameters, CARMASK parameters, TSNRM parameters, MAXSNRM parameters, data rate parameters, etc. and/or any other operational characteristics of the relevant communication lines).

Embodiments of the present invention can utilize a database, library or other collection of data pertaining to the data collected, past operation of the vectored DSL system, the new VDSL line and any other relevant lines and equipment. This collection of reference data may be stored, for example, as a library 1048 in the controller 1010 of FIG. 10A and used by the analyzing means 1040 and/or collecting means 1020.

In various embodiments of the invention, the loading/ordering control unit 1000 (which can be used for, but is not limited to, vector training and binder/line characteristic identification) may be implemented in one or more computers such as PCs, workstations or the like. The collecting means 1020 and analyzing means 1040 may be software modules, hardware modules or a combination of both, as will be appreciated by those skilled in the art. When working with a large numbers of modems, databases may be introduced and used to manage the volume of data collected.

Figure 10B:
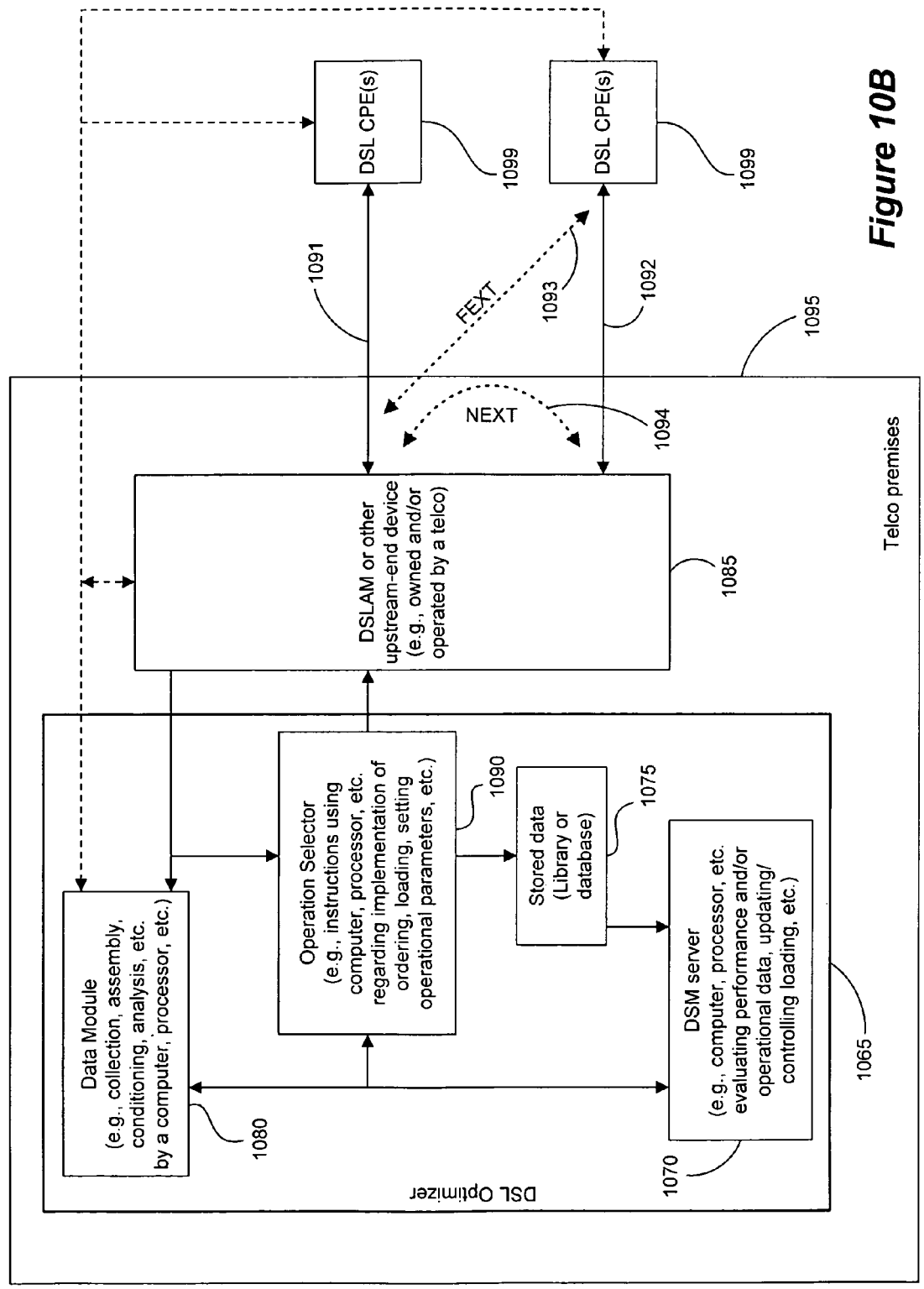
FIG. 10B is a DSL optimizer according to one embodiment of the present invention.

Another embodiment of the present invention is shown in FIG. 10B. A DSL optimizer 1065 operates on and/or in connection with a DSLAM 1085 or other DSL system component (for example, an RT, ONU/LT, etc.), either or both of which may be on the premises 1095 of a telecommunication company (a "telco"). The DSL optimizer 1065 includes a data module 1080, which can collect, assemble, condition, manipulate and/or supply operational data for and to the DSL optimizer 1065. Module 1080 can be implemented in one or more computers such as PCs or the like. Data from module 1080 is supplied to a DSM server module 1070 for analysis (for example, evaluating an appropriate training operation for a new VDSL line, evaluating that new line's impact on a vectored system near the new line, calculating GDFE parameters for upstream, calculating precoding parameters for downstream, deciding the ordering of users, etc.). Information also may be available from a library or database 1075 that may be related or unrelated to the telco.

An operation selector 1090 may be used to implement, modify and/or cease DSL and/or other communication operations, including implementation of various operational parameters involving transmit power, carrier masks, etc. Such decisions may be made by the DSM server 1070 or by any other suitable manner, as will be appreciated by those skilled in the art. Operational modes and/or parameters selected by selector 1090 are implemented in the DSLAM 1085 and/or any other appropriate DSL system component equipment. Such equipment may be coupled to DSL equipment such as customer premises equipment 1099. In the case of the introduction of a new VDSL line into a binder in which a vectored system and/or other communication lines are operating, the DSLAM 1085 can be used to implement signal and other controls of the type discussed herein within and/or between various lines. For example, a new VDSL line 1092 may be trained and evaluated as it relates to one or more existing lines 1091 and/or a vectored system, including the impact that the new VDSL line 1092 is likely to have in terms of FEXT 1093 and NEXT 1094 that impacts performance of line(s) 1091. The system of FIG. 10B can operate in ways analogous to the system of FIG. 10A, as will be appreciated by those skilled in the art, though differences are achievable while still implementing embodiments of the present invention.

Generally, embodiments of the present invention employ various processes involving data stored in or transferred through one or more computer systems, which may be a single computer, multiple computers and/or a combination of computers (any and all of which may be referred to interchangeably herein as a "computer" and/or a "computer system"). Embodiments of the present invention also relate to a hardware device or other apparatus for performing these operations. This apparatus may be specially constructed for the required purposes, or it may be a general-purpose computer and/or computer system selectively activated or reconfigured by a computer program and/or data structure stored in a computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

Embodiments of the present invention also relate to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 11:
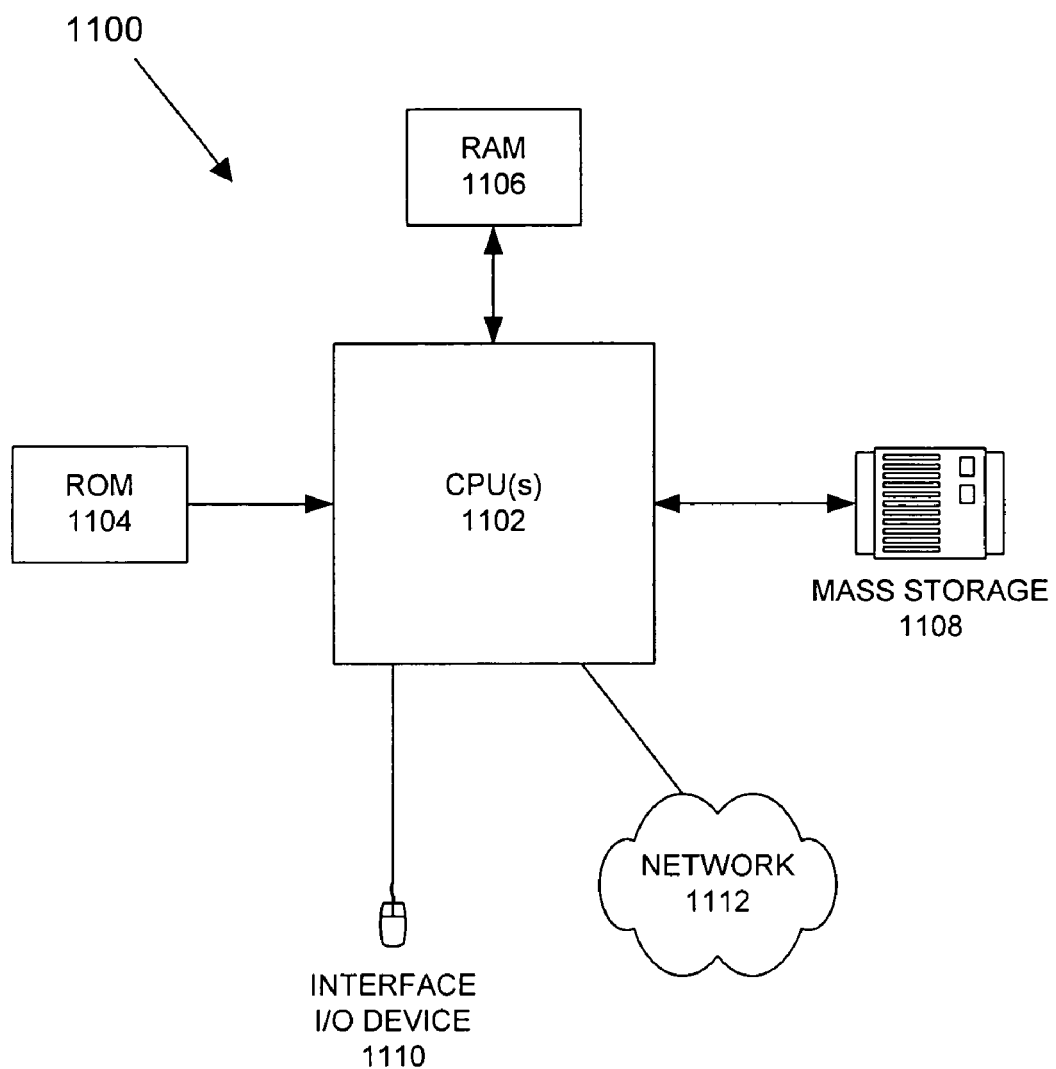
FIG. 11 is a block diagram of a typical computer system or integrated circuit system suitable for implementing embodiments of the present invention.

FIG. 11 illustrates a typical computer system that can be used by a user and/or controller in accordance with one or more embodiments of the present invention. The computer system 1100 includes any number of processors 1102 (also referred to as central processing units, or CPUs) that are coupled to storage devices including primary storage 1106 (typically a random access memory, or RAM), primary storage 1104 (typically a read only memory, or ROM). As is well known in the art, primary storage 1104 acts to transfer data and instructions uni-directionally to the CPU and primary storage 1106 is used typically to transfer data and instructions in a bi-directional manner. Both of these primary storage devices may include any suitable of the computer-readable media described above. A mass storage device 1108 also is coupled bi-directionally to CPU 1102 and provides additional data storage capacity and may include any of the computer-readable media described above. The mass storage device 1108 may be used to store programs, data and the like and is typically a secondary storage medium such as a hard disk that is slower than primary storage. It will be appreciated that the information retained within the mass storage device 1108, may, in appropriate cases, be incorporated in standard fashion as part of primary storage 1106 as virtual memory. A specific mass storage device such as a CD-ROM 1114 may also pass data uni-directionally to the CPU.

CPU 1102 also is coupled to an interface 1110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1102 optionally may be coupled to a computer or telecommunications network using a network connection as shown generally at 1112. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a codeword composition controller may be stored on mass storage device 1108 or 1114 and executed on CPU 1102 in conjunction with primary memory 1106. In a preferred embodiment, the controller is divided into software submodules.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of assigning bits for a plurality of lines in a vectored Digital Subscriber Line (DSL) system using Discrete MultiTone (DMT) modulation, the method comprising:
    performing a first iteration comprising the steps:
        [1] determining a new user line ordering position for each of a plurality of tones in the vectored DSL system, wherein the determined new user line ordering position defines the order in which each of the plurality of lines in the vectored DSL system are decoded or precoded, and wherein the first iteration further comprises one or both of the steps:
        [2] determining a power spectral density for a signal transmitted on each of the plurality of lines, and
        [3] determining a bit allocation for the signal transmitted on each of the plurality of lines, when the determined new user line ordering position is different than an existing user line order;
    performing an order-swapping operation on the determined new user line ordering positions, including:
        re-assigning a first user's line to a first initial line position associated with a second user's line,
        re-assigning the second user's line to a second initial line position associated with the first user's line,
        moving the first user's line to the re-assigned first initial line position, and
        moving the second user's line to the re-assigned second initial line position; and
    performing one or more subsequent iterations, wherein each subsequent iteration comprises performing two or more of steps 1 through 3.

2. The method of claim 1 wherein determining the new user line ordering positions comprises at least one of the following:
    determining a decoding order of the plurality of lines for each tone of a vectored DSL receiver; or
    determining a precoding order of the plurality of lines for each tone of a vectored DSL transmitter.

3. The method of claim 1 wherein determining the new user line ordering positions comprises at least one of the following:
    determining the same line ordering for all tones on all lines in the plurality of lines; or
    determining an individual ordering for each line of the plurality of lines for each tone, wherein the orderings for lines do not have to be identical.

4. The method of claim 1 wherein the method is used in at least one of the following phases:
    initialization of all of the lines in the plurality of lines; or
    normal operation of all of the lines in the plurality of lines; or
    a time period during which at least one line of the plurality of lines is in normal operation and at least one line of the plurality of lines is in initialization.

5. The method of claim 1 wherein moving the first user's line and moving the second user's line are performed after evaluating the performance of the vectored DSL system using the assigned first line and second line positions.

6. The method of claim 1 wherein the plurality of lines comprises:
    at least one line of the vectored DSL system that is in normal operation; and
    at least one line of the vectored DSL system that is being initialized.

7. The method of claim 1 wherein determining the new user line ordering position further comprises:
    initially assigning to at least one line that is in initialization, an ordering position that increases a transmission rate performance of one or more other lines of the plurality of lines of the vectored DSL system; and
    adjusting the ordering of the one or more other lines to achieve a targeted performance change for the vectored DSL system.

8. The method of claim 1 wherein the method is applied for an upstream DSL transmission; and
    further wherein the method comprises performing an upstream power spectral density determination comprising solving a problem of minimizing a weighted energy sum given a set of user data rates.

9. The method of claim 1 wherein the method is applied for an upstream DSL transmission; and further wherein the method comprises performing an upstream power spectral density determination comprising solving a problem of achieving a set of user data rates while satisfying an energy vector constraint.

10. The method of claim 1 wherein the method is applied for a downstream DSL transmission; and further wherein the method comprises performing a downstream power spectral density determination comprising using a duality method based on a duality between a broadcast channel and its equivalent multiple-access channel with an iterative water-filling method that maximizes a sum of users data rates.

11. A non-transitory computer-readable storage medium having instructions stored thereon that, when executed by a processor in a vectored Digital Subscriber Line (DSL) system using Discrete MultiTone (DMT) modulation, performs a method of assigning bits for a plurality of lines in the vectored DSL system using DMT modulation, wherein the method comprises:

performing a first iteration comprising the steps:

[1] determining a new user line ordering position for each of a plurality of tones in the vectored DSL system, wherein the determined new user line ordering position defines the order in which each of the plurality of lines in the vectored DSL system are decoded or precoded, and wherein the first iteration further comprises one or both of the steps:

[2] determining a power spectral density for a signal transmitted on each of the plurality of lines, and

[3] determining a bit allocation for the signal transmitted on each of the plurality of lines, when the determined new user line ordering position is different than an existing user line order;

performing an order-swapping operation on the determined new user line ordering positions, including:

re-assigning a first user's line to a first initial line position associated with a second user's line, re-assigning the second user's line to a second initial line position associated with the first user's line, moving the first user's line to the re-assigned first initial line position, and moving the second user's line to the re-assigned second initial line position; and performing one or more subsequent iterations, wherein each subsequent iteration comprises performing two or more of steps 1 through 3.

12. The non-transitory computer-readable storage medium of claim 11, wherein determining the new user line ordering position comprises at least one of the following:

determining a decoding order of the plurality of lines for each tone of a vectored DSL receiver; or determining a precoding order of the plurality of lines for each tone of a vectored DSL transmitter.

13. The non-transitory computer-readable storage medium of claim 11, wherein determining the new user line ordering positions comprises at least one of the following:

determining the same line ordering for all tones on all lines in the plurality of lines; or determining an individual ordering for each line of the plurality of lines for each tone, wherein the orderings for lines do not have to be identical.

14. The non-transitory computer-readable storage medium of claim 11, wherein the method is used in at least one of the following phases:

initialization of all of the lines in the plurality of lines; or normal operation of all of the lines in the plurality of lines; or a time period during which at least one line of the plurality of lines is in normal operation and at least one line of the plurality of lines is in initialization.

15. The non-transitory computer-readable storage medium of claim 11, wherein moving the first user's line and moving the second user's line are performed after evaluating the performance of the vectored DSL system using the assigned first line and second line positions.

16. The non-transitory computer-readable storage medium of claim 11, wherein the plurality of lines comprises:

at least one line of the vectored DSL system that is in normal operation; and at least one line of the vectored DSL system that is being initialized.

17. The non-transitory computer-readable storage medium of claim 11, wherein determining the new user line ordering position further comprises:

initially assigning to at least one line that is in initialization, an ordering position that increases a transmission rate performance of one or more other lines of the plurality of lines of the vectored DSL system; and adjusting the ordering of the one or more other lines to achieve a targeted performance change for the vectored DSL system.

18. The non-transitory computer-readable storage medium of claim 11, wherein the method is applied for an upstream DSL transmission; and further wherein the method comprises performing an upstream power spectral density determination comprising solving a problem of minimizing a weighted energy sum given a set of user data rates.

19. The non-transitory computer-readable storage medium of claim 11, wherein the method is applied for an upstream DSL transmission; and further wherein the method comprises performing an upstream power spectral density determination comprising solving a problem of achieving a set of user data rates while satisfying an energy vector constraint.

20. The non-transitory computer-readable storage medium of claim 11, wherein the method is applied for a downstream DSL transmission; and further wherein the method comprises performing a downstream power spectral density determination comprising using a duality method based on a duality between a broadcast channel and its equivalent multiple-access channel with an iterative water-filling method that maximizes a sum of users data rates.

* * * * *